(12) United States Patent
Mori et al.

(10) Patent No.: US 7,826,653 B2
(45) Date of Patent: Nov. 2, 2010

(54) FLUID MEASURING SYSTEM AND LONG FOCAL POINT OPTICAL SYSTEM

(75) Inventors: Michitsugu Mori, Tokyo (JP); Hideaki Tezuka, Tokyo (JP)

(73) Assignee: The Tokyo Electric Power Company, Incorporated, Tokyo (JP)

(*) Notice: Subject to any disclaimer, the term of this patent is extended or adjusted under 35 U.S.C. 154(b) by 910 days.

(21) Appl. No.: 10/594,633

(22) PCT Filed: Mar. 31, 2005

(86) PCT No.: PCT/JP2005/006385

§ 371 (c)(1),
(2), (4) Date: Jan. 17, 2007

(87) PCT Pub. No.: WO2005/095995

PCT Pub. Date: Oct. 13, 2005

(65) Prior Publication Data

US 2007/0268602 A1 Nov. 22, 2007

(30) Foreign Application Priority Data

Mar. 31, 2004 (JP) ............................. 2004-102162
Jul. 9, 2004 (JP) ............................. 2004-203988

(51) Int. Cl.
*G06K 9/00* (2006.01)
*G06K 9/68* (2006.01)

(52) U.S. Cl. ...................................... 382/141; 382/218

(58) Field of Classification Search ................ 382/141, 382/218, 274; 73/170.01, 170.11; 359/850
See application file for complete search history.

(56) References Cited

U.S. PATENT DOCUMENTS

| | | | | |
|---|---|---|---|---|
| 4,842,384 A * | 6/1989 | Mercado | ...................... | 359/648 |
| 4,934,801 A * | 6/1990 | Mercado | ...................... | 359/355 |
| 5,249,238 A | 9/1993 | Komerath et al. | | |
| 5,561,515 A * | 10/1996 | Hairston et al. | ................ | 356/28 |
| 6,473,243 B1 * | 10/2002 | Omura | ...................... | 359/730 |
| 2002/0044260 A1 | 4/2002 | Takahashi et al. | | |

FOREIGN PATENT DOCUMENTS

| | | |
|---|---|---|
| DE | 100 38 460 | 2/2002 |
| EP | 1 162 447 | 12/2001 |
| JP | 6 66823 | 3/1994 |

(Continued)

OTHER PUBLICATIONS

U.S. Appl. No. 11/632,284, filed Jan. 12, 2007, Mori, et al.
U.S. Appl. No. 12/091,754, filed Apr. 28, 2008, Mori, et al.
U.S. Appl. No. 10/594,761, filed Sep. 29, 2006, Mori, et al.
European Search Report dated May 10, 2010, 7 pages; Application No. 05728029.9.

(Continued)

*Primary Examiner*—Daniel G Mariam
(74) *Attorney, Agent, or Firm*—Oblon, Spivak, McClelland, Maier & Neustadt, L.L.P.

(57) ABSTRACT

A fluid measurement system includes a long focus optical system at a CCD camera, and an image processor for comparing particle images taken at two time points for analysis. The long focus optical system is provided with a shield which shields a part including a central portion of a main mirror at an arbitrary shield rate. As a result, the particle image of a tracer is enlarged with its contour kept clear, that is, in focus, and therefore, the image having a luminance which allows analysis by the PIV method can be taken in spite of use of the long focus optical system.

10 Claims, 20 Drawing Sheets

FOREIGN PATENT DOCUMENTS

| | | |
|---|---|---|
| JP | 7 5188 | 1/1995 |
| JP | 8 247846 | 9/1996 |
| JP | 2002 83766 | 3/2002 |
| JP | 2003 84005 | 3/2003 |

OTHER PUBLICATIONS

Application of particle image velocimetry to large-scale transonic wind tunnels, C.E. Towers, P.J. Bryanston-Cross, T.R. Judge; Optics & Laser Technology, vol. 23 No. 5 Oct. 1, 1991, pp. 289-295.

* cited by examiner

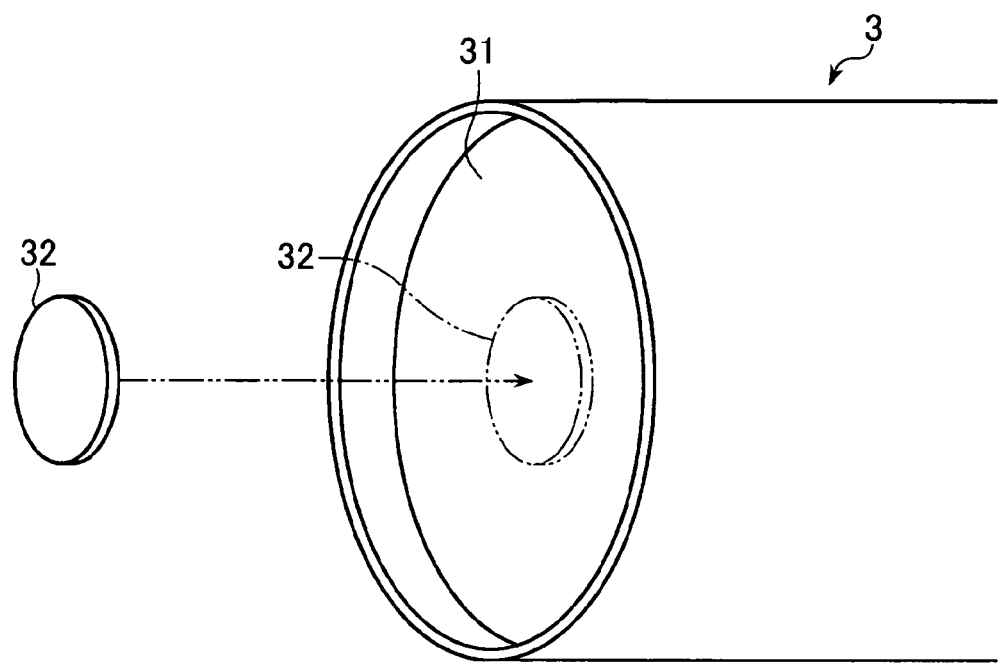
F I G. 2

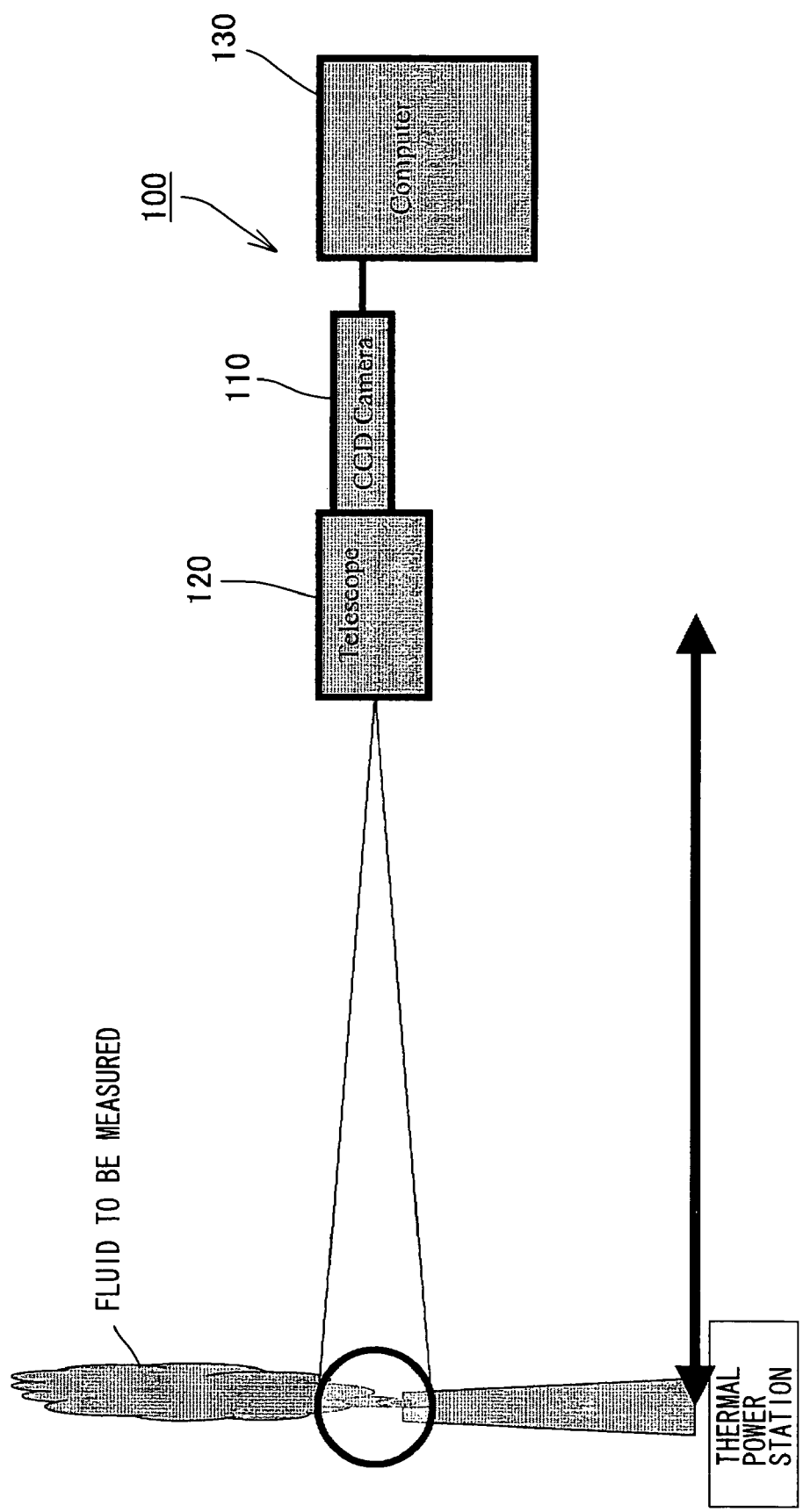

FIG. 7A

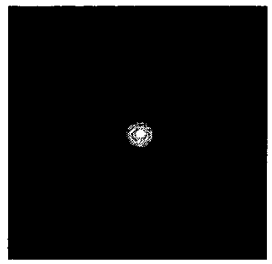

APERTURE 140 mm
(CENTER SHIELD RATE OF 0 %)
(INPUT IS DELTA FUNCTION:
SIMULATE THE CASE OF ONE TRACER)

FIG. 7B

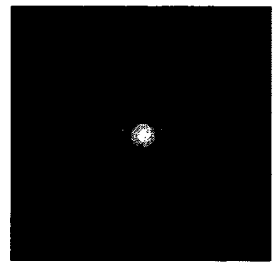

APERTURE 140 mm
(CENTER SHIELD RATE OF 35 %)

FIG. 7C

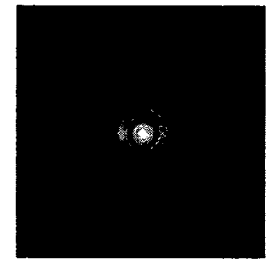

APERTURE 140 mm
(CENTER SHIELD RATE OF 50 %)

FIG. 7D

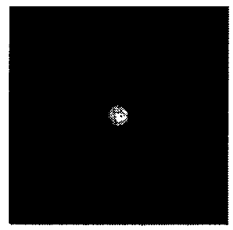

APERTURE 140 mm
(CENTER SHIELD RATE OF 0 %)
(WHEN FOCUS IS SHIFTED)

FIG. 7E

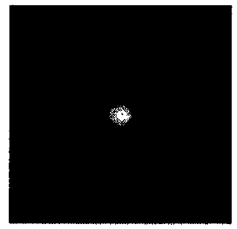

APERTURE 140 mm
(CENTER SHIELD RATE OF 35 %)
(WHEN FOCUS IS SHIFTED)

FIG. 7F

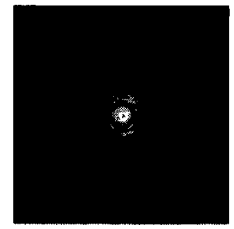

APERTURE 140 mm
(CENTER SHIELD RATE OF 50 %)
(WHEN FOCUS IS SHIFTED)

FIG. 7G

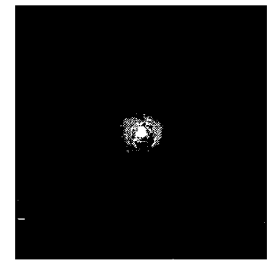

APERTURE 70 mm
(CENTER SHIELD RATE OF 0 %)

APERTURE 140 mm (CENTER SHIELD RATE OF 0 %)
(SIMULATION OF THE CASE OF IMAGING WITH CCD CAMERA)

APERTURE 140 mm (CENTER SHIELD RATE OF 35 %)
(SIMULATION OF THE CASE OF IMAGING WITH CCD CAMERA)

APERTURE 140 mm (CENTER SHIELD RATE OF 50 %)
(SIMULATION OF THE CASE OF IMAGING WITH CCD CAMERA)

STANDARD IMAGE

APERTURE 140 mm
(CENTER SHIELD RATE OF 50 %)

APERTURE 140 mm
(CENTER SHIELD RATE OF 0 %)

APERTURE 70 mm
(CENTER SHIELD RATE OF 0 %)

APERTURE 140 mm
(CENTER SHIELD RATE OF 35 %)

APERTURE 250 mm
(CENTER SHIELD RATE OF 50 %)

ORIGINAL IMAGE

APERTURE 140 mm
(CENTER SHIELD RATE OF 0 %)

APERTURE 140 mm
(CENTER SHIELD RATE OF 35 %)

APERTURE 140 mm
(CENTER SHIELD RATE OF 50 %)

ORIGINAL IMAGE

APERTURE 140 mm
(CENTER SHIELD RATE OF 50 %)

APERTURE 140 mm
(CENTER SHIELD RATE OF 0 %)

APERTURE 70 mm
(CENTER SHIELD RATE OF 0 %)

APERTURE 140 mm
(CENTER SHIELD RATE OF 35 %)

F I G. 1 5
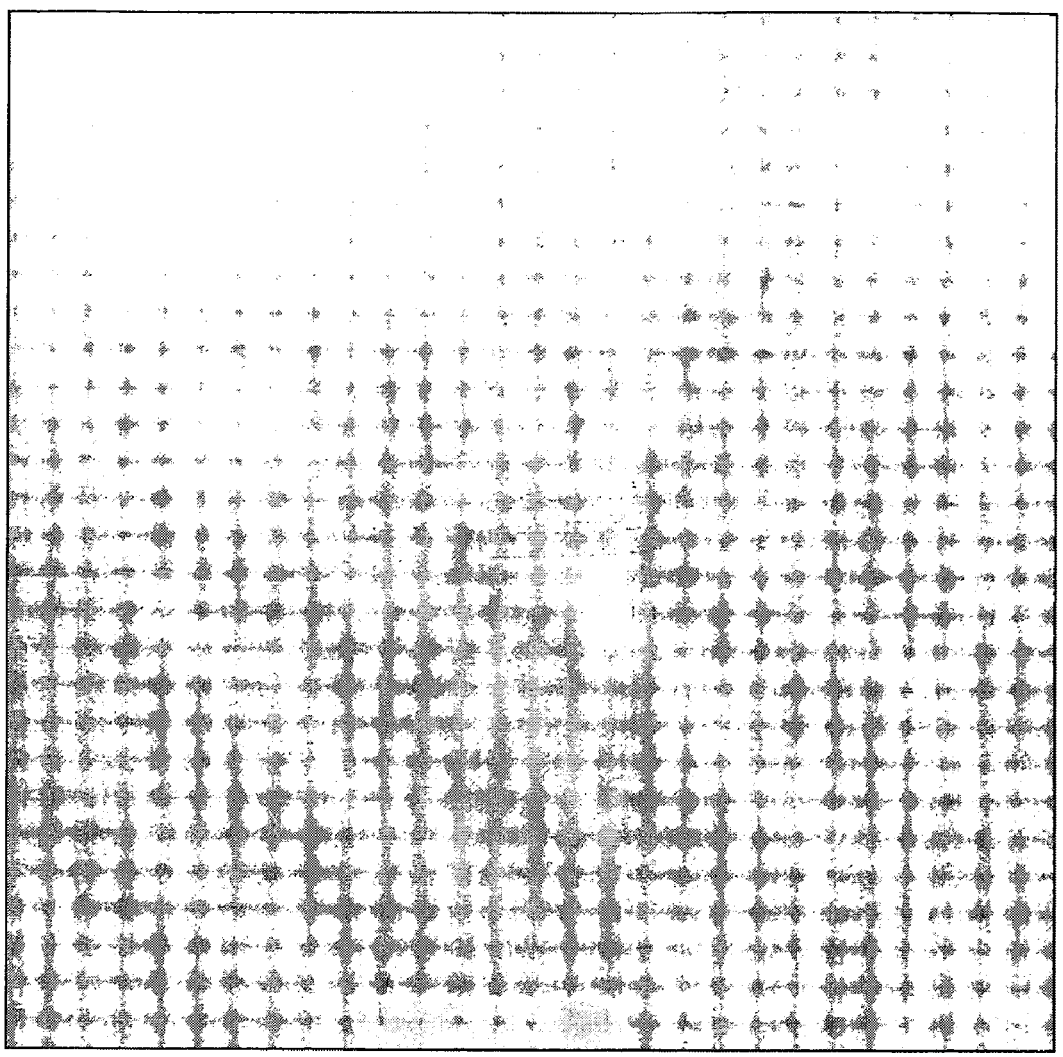

F I G. 16
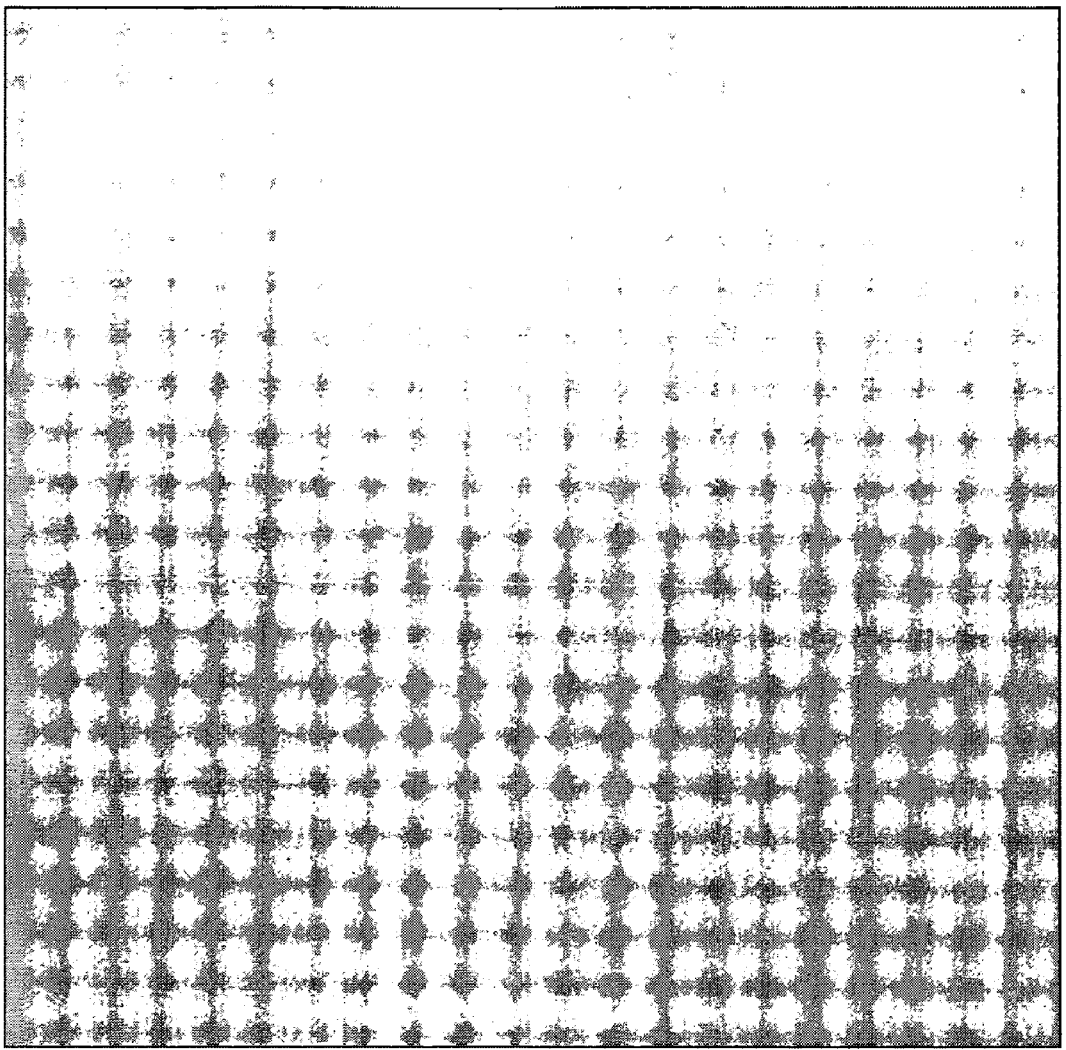

F I G. 1 9
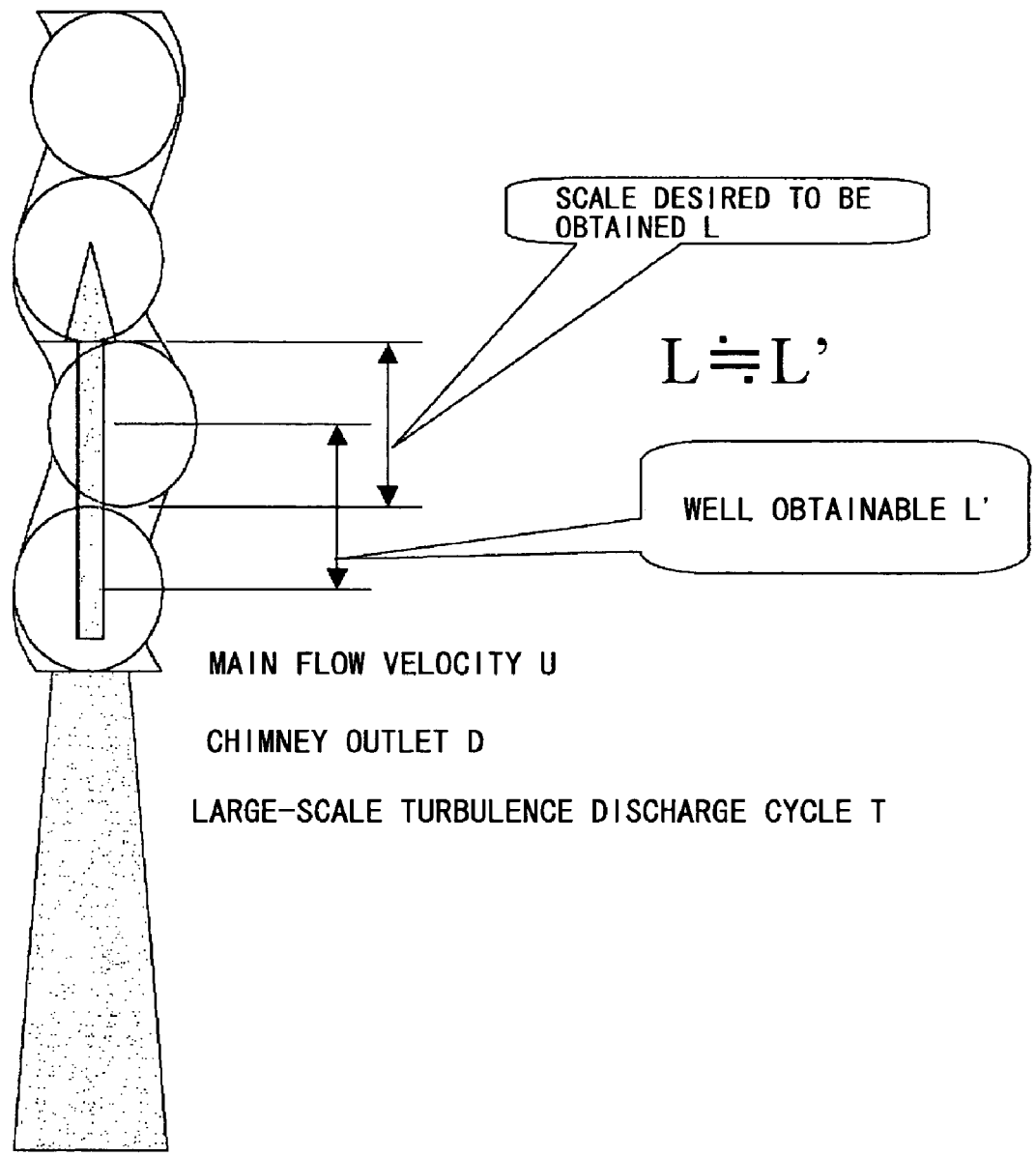

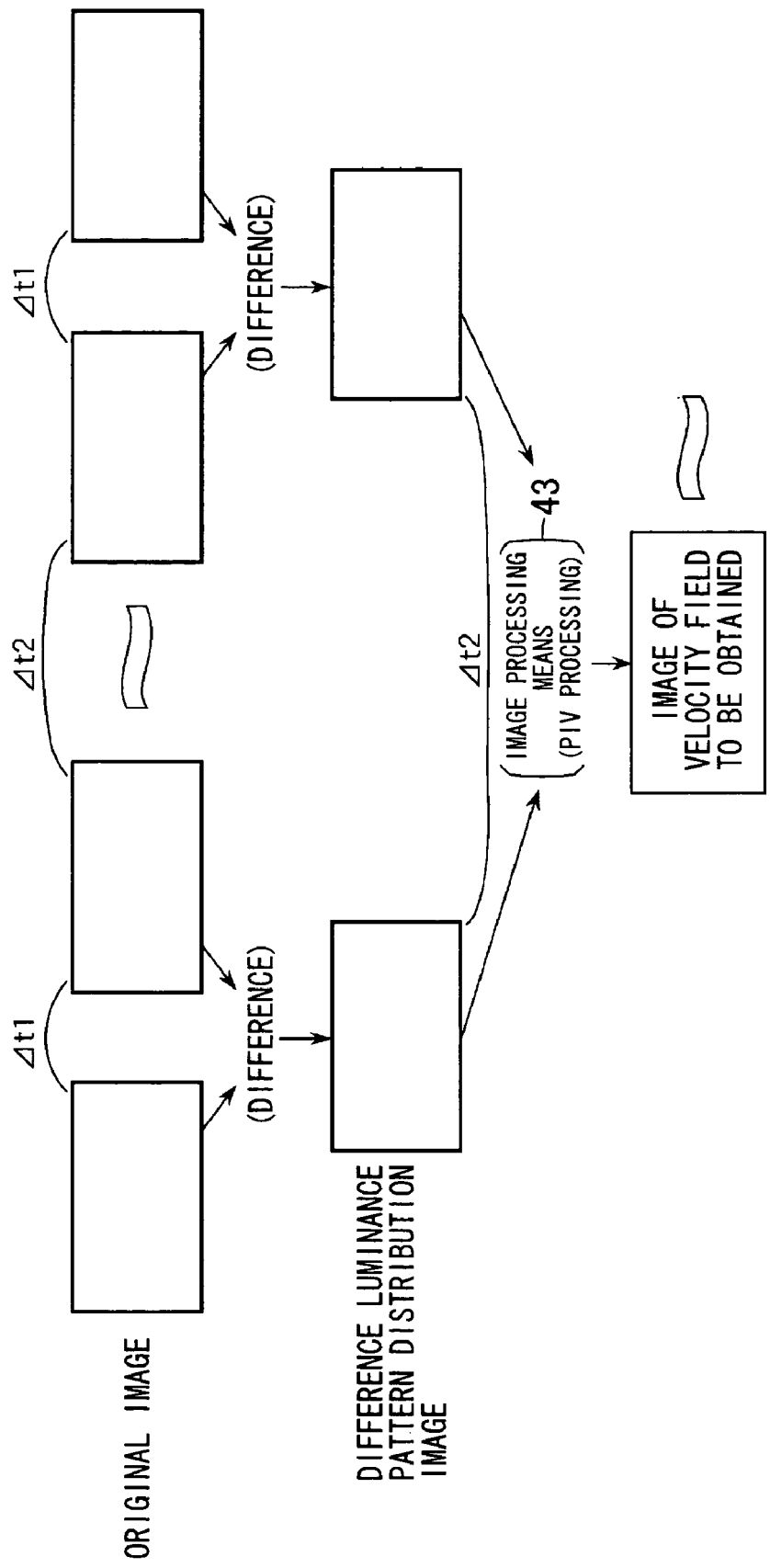

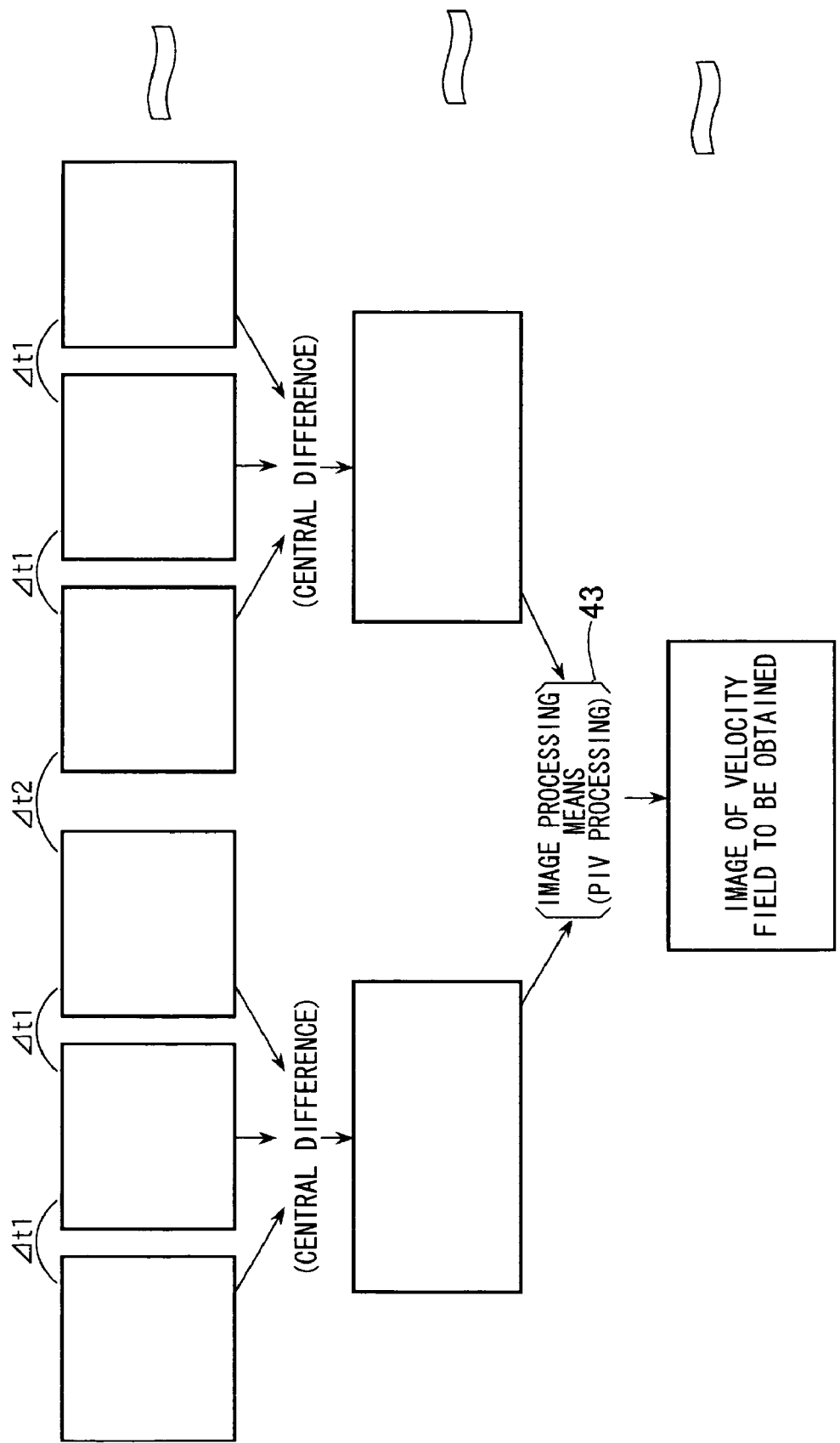

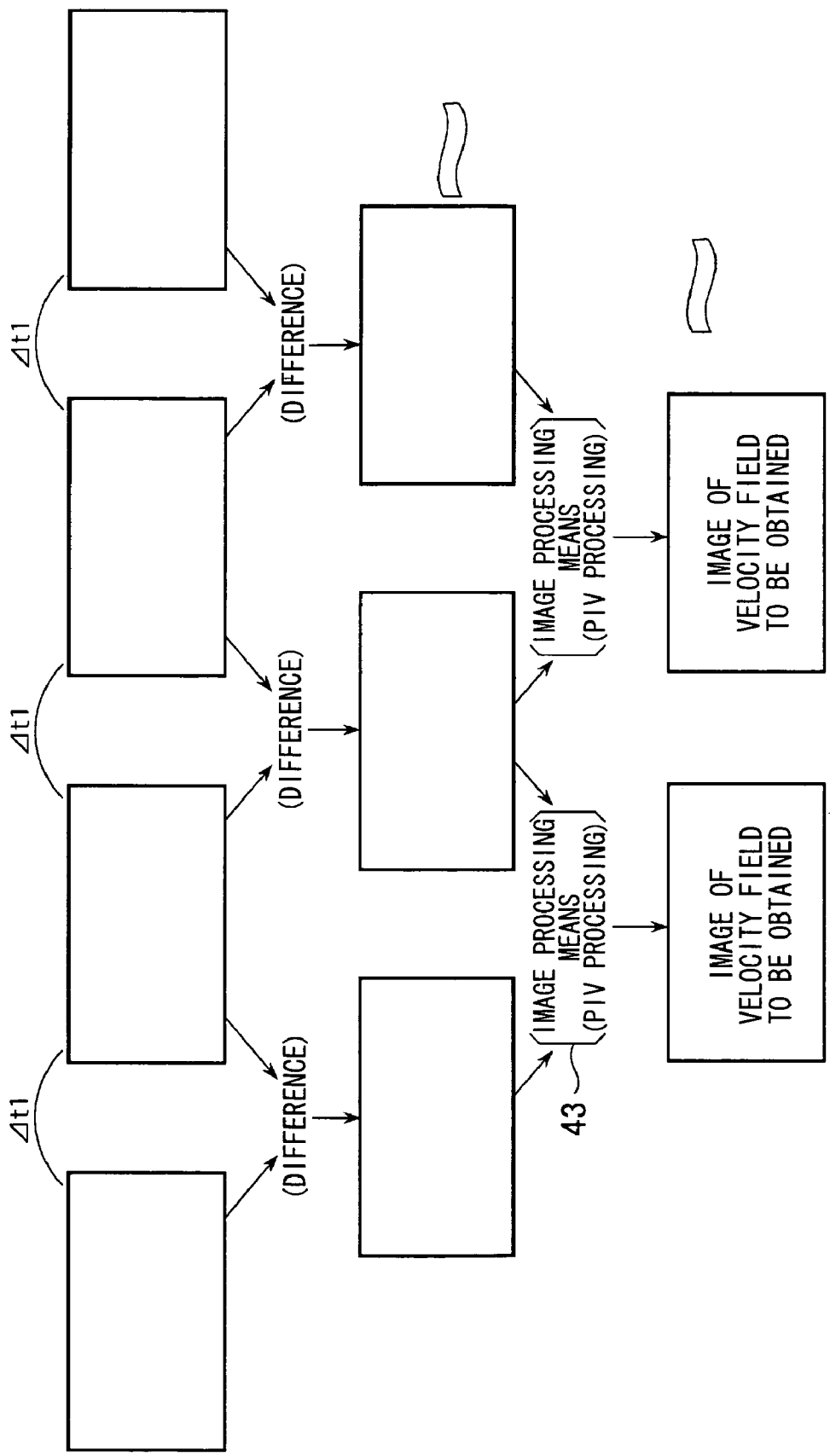

FLUID MEASURING SYSTEM AND LONG FOCAL POINT OPTICAL SYSTEM

TECHNICAL FIELD

The present invention relates to a long distance type fluid measurement system for analyzing the flow field of a distant fluid to be measured, and a long focus optical system used in the fluid measurement system.

BACKGROUND ART

As a system for observing, for example, smoke exhausted from a chimney of a power station or the like, technologies disclosed in Patent Document 1 and Patent Document 2 are known. These technologies use a plurality of ITVs or color cameras to detect the presence or absence of smoke exhausted from the chimney using parallax and color difference between the cameras.

Patent Document 1: Japanese Patent Application Laid-open No. S63-88428

Patent Document 2: Japanese Patent Application Laid-open No. H10-232198

DISCLOSURE OF THE INVENTION

Problem to be Solved by the Invention

As for smoke exhausted from a chimney of a power station and the like, water vapor, volcanic ash, yellow sand and so on, it is desired to detect the flow such as the velocity and direction of the flow of the smoke and the like for operation control of the power station and the like, prediction of the effect on its ambient environment and so on. By the technologies disclosed in Patent Document 1 and Patent Document 2, however, only the presence or absence of smoke or the like can be detected.

On the other hand, recently, a Particle Image Velocimetry (hereinafter referred to as "PIV") such as an image correlation method and a Particle Tracing Velocimetry (PTV) is known which measures the flow of a complex flow field with high accuracy and precision by processing particle images. For example, a laser light is inputted in a sheet form into the flow field of the fluid to be measured to form a laser sheet so that particle images on the laser sheet at two time points are taken, and their luminance pattern distributions are compared to each other to measure the flow velocity and the direction of the fluid. However, PIV is only used mainly for analysis of the flow field of fluid in a closed space, such as analysis of the flow field of liquid such as water, oil and so on, analysis of the flow field of combustion, and analysis of the flow field by wind tunnel experiment around a moving object such as an automobile or the like. In other words, the conventional PIV has been developed merely for a short distance, a distance to the fluid to be measured of about 1 meter, that is, for a so-called laboratory, and it is desired to use PIV at a practical level.

The present invention has been developed in consideration of the above viewpoints, and its object is to provide a fluid measurement system capable of detecting the flow of a distant fluid to be measured such as smoke exhausted from a chimney, water vapor, volcanic ash, yellow sand and so on to provide a new application of PIV at a practical level, and a long focus optical system used in the fluid measurement system.

Means to Solve the Problem

To achieve the above-described object, the inventors first focused attention on use of a long focus optical system. On the other hand, if an image is picked up by a long focus optical system, the image becomes darker as the magnification of the optical system is higher, and analysis by the PIV method becomes difficult. Hence, the inventors focused attention on enlargement of the particle image of the tracer kept in focus with its contour kept clear, and reached the completion of the present invention.

Namely, the invention provides a fluid measurement system comprising an imaging means for taking images of particles contained in a fluid to be measured at small time intervals, a control means for controlling the imaging means, and an image processing means for comparing luminance pattern distributions at a plurality of consecutive time points obtained by the imaging means to measure a moving direction and a moving amount of a particle group, and analyzing a flow field of the fluid to be measured, the imaging means comprising a long focus optical system being of a long distance type capable of imaging a fluid to be measured a long distance away, and the long focus optical system being provided with a shield which shields a part including a central portion of a main mirror at an arbitrary shield rate.

The invention provides the fluid measurement system described above, wherein the shield rate found by a ratio of a diameter of the shield to an aperture of the long focus optical system is provided to be arbitrarily adjustable.

The invention provides the fluid measurement system described above, wherein the shield rate is set in a range of 20% to 60% when one particle image obtained by the imaging means across two pixels or more, and is set in a range of 0% to 40% when a plurality of particle images are contained in one pixel.

The invention provides the fluid measurement system described above, wherein a secondary mirror included in the long focus optical system is supported by parallel plate glasses whose surfaces are disposed to be oriented in a direction perpendicular to the optical axis of a main mirror in the lens barrel.

The invention provides the fluid measurement system described above, wherein the imaging means is of a long distance type capable of imaging a luminance pattern distribution by natural light reflection in the fluid to be measured a long distance away.

The invention provides the fluid measurement system described above, further comprising:

a laser light input means for inputting a laser light in a sheet form into the fluid to be measured, wherein the imaging means is of a long distance type capable of imaging a luminance pattern distribution by the laser light reflection in the fluid to be measured a long distance away.

The invention provides the fluid measurement system described above, wherein the imaging means is of a long distance type capable of imaging the fluid to be measured 10 m or greater and 20 km or less away from the set position of the imaging means.

The invention provides a long focus optical system constructed by supporting a main mirror and a secondary mirror in a mirror barrel, comprising a shield which shields a part including a central portion of a main mirror at a predetermined shield rate.

The invention provides the long focus optical system described above, wherein the shield rate found by a diameter of the shield with respect to an aperture is settable in a range of 20% to 60% when one particle image obtained by an imaging means is across two pixels or more, and is settable in a range of 0% to 40% when a plurality of particle images are included in one pixel.

The invention provides the long focus optical system described above, wherein the secondary mirror is supported by parallel plate glasses whose surfaces are disposed to be oriented in a direction perpendicular to the optical axis of a main mirror in the lens barrel.

The invention provides the long focus optical system described above, the long focus optical system being used in an imaging means in a fluid measurement system comprising the imaging means for taking images of particles contained in a fluid to be measured at small time intervals, a control means for controlling the imaging means, and an image processing means for comparing luminance pattern distributions at a plurality of consecutive time points obtained by the imaging means to measure a moving direction and a moving amount of a particle group, and analyzing a flow field of the fluid to be measured.

Effect of the Invention

The present invention includes a long focus optical system and an image processing means for comparing particle images taken at two consecutive time points for analysis, thereby allowing the flow field of an inaccessible fluid to be measured to be analyzed to provide a new application of the PIV system at a practical level. The long focus optical system of the present invention is especially provided with a shield which shields a part including a central portion of a main mirror at an arbitrary shield rate. As a result, the particle image of a tracer is enlarged with its contour kept clear, that is, kept in focus, and therefore, the image having a luminance which allows analysis by the PIV method can be taken in spite of use of the long focus optical system.

BRIEF DESCRIPTION OF DRAWINGS

FIG. 2 is a conceptual diagram showing the state in which a shield is provided at a long focus optical system of the fluid measurement system according to the above described embodiment;

FIG. 6 is a diagram showing the outline of a fluid measurement system according to another embodiment of the present invention;

FIG. 7A to 7G are simulation diagrams showing particle images of a tracer (images of Airy disk) taken by using an optical telescope, FIG. 7A shows the case of a center shield rate by a center shield (center shield diameter/optical telescope aperture) of 0%, FIG. 7B shows the case of a center shield rate of 35%, and FIG. 7C shows the case of a center shield rate of 50%, FIG. 7D shows an image of an Airy disk taken with only a focal length shifted by 0.3 mm under the same condition as in FIG. 7A, FIGS. 7E and 7F show the images in the case of center shield rates of 35% and 50% with the focal length shifted by 0.3 mm, and 7G shows the image taken by the optical telescope of an aperture of 70 mm;

FIG. 8A shows the case of a center shield rate by the center shield (center shield diameter/optical telescope aperture) of 0%, FIG. 8B shows the case of a center shield rate of 35%, and FIG. 8C shows the case of a center shield rate of 50%;

FIG. 15 is a view showing an original image of exhaust smoke being a fluid to be measured in Test Example 6;

FIG. 16 is an image of a turbulence structure showing the image filtered by the high-pass filter and then inversely transformed in Test Example 6;

FIG. 19 is an illustration for explaining the way to obtain a spatial frequency at the time of filtering by a high-pass filter;

FIG. 20 is a conceptual diagram for explaining one example of a difference calculation means;

FIG. 21 is a conceptual diagram for explaining another example of the difference calculation means; and FIG. 22 is a conceptual diagram for explaining still another example of the difference calculation means.

BEST MODE FOR CARRYING OUT THE INVENTION

Figure 1:
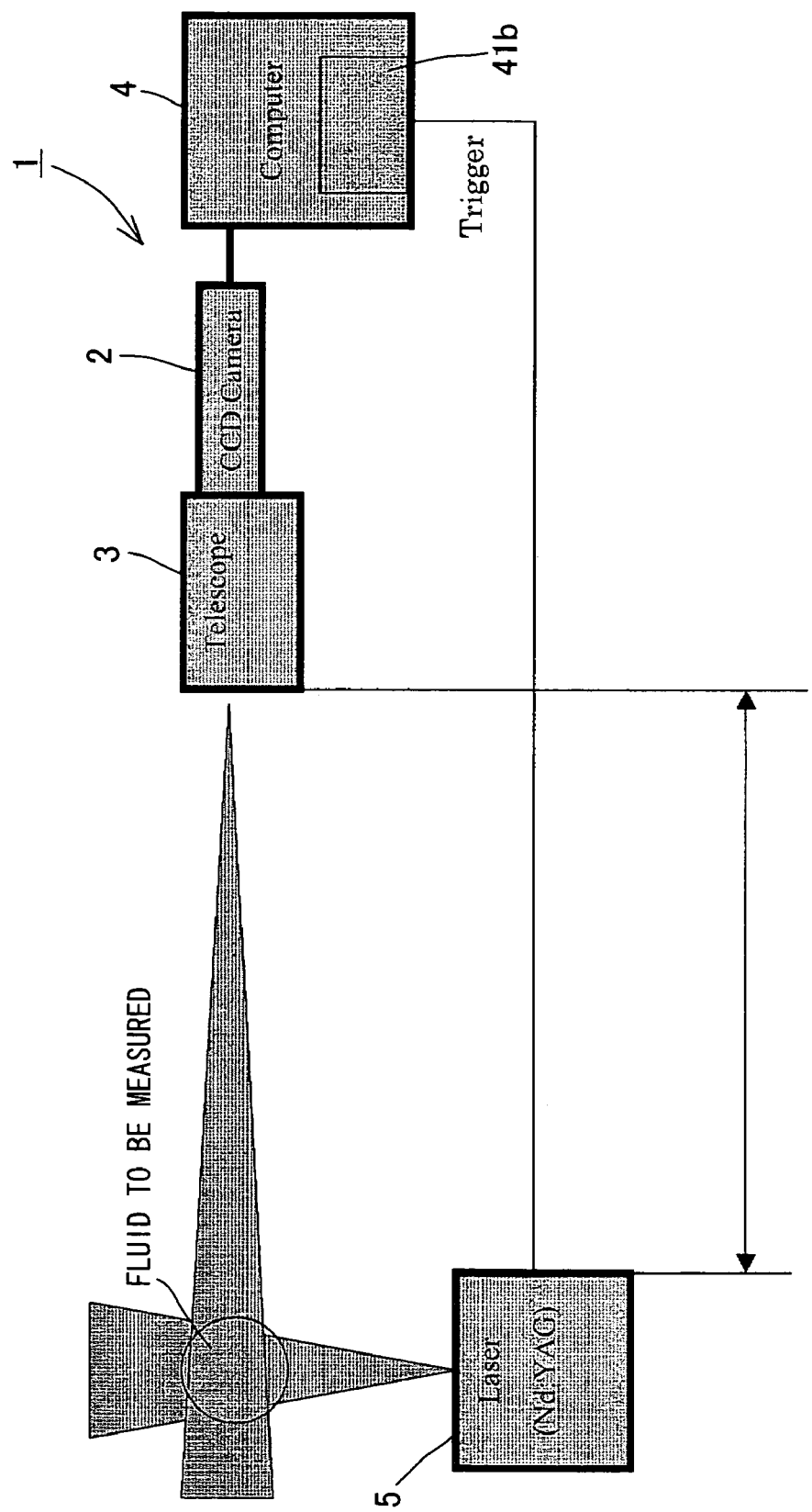
FIG. 1 is a diagram showing the outline of a fluid measurement system according to an embodiment of the present invention.

Hereinafter, embodiments of the present invention will be described in more detail with reference to the drawings. FIG. 1 shows a fluid measurement system 1 according to an embodiment of the present invention, which comprises a CCD camera 2 including a long focus optical system 3 as an imaging means, a computer 4, a laser light input means 5 and so on.

The CCD camera 2 is equipped with the long focus optical system 3, and a single focus lens (hereinafter, referred to as a "single lens") is preferably used as the long focus optical system 3. In this case, it is more preferable to provide a turret to form a configuration so that a plurality of kinds of single lenses can be selected. The use of the turret also allows automatic selection from among the single lenses. A lens with a zoom function generally has a disadvantage in a large field curvature, but such a lens can be used as long as it is made of glass with a high refraction index to be able to present a stable image. Note that although the camera (CCD camera) including a CCD image sensor is used as the imaging means in this embodiment, a camera can be used instead which includes a CMOS image sensor.

Besides, any of Newtonian, Cassegrain, or other telescopes can be used as an optical telescope constituting the long focus optical system 3, and as shown in FIG. 2, a main mirror 31 has the construction provided with a shield 32 which shields a part including its central portion at an optional shield rate. Thereby, the tracer particle image is enlarged with its contour kept clear, that is, not out of focus, but in focus. When an image is taken by the long focus optical system 3, the image becomes darker as the scaling factor of the optical system becomes higher, and analysis by the PIV method becomes difficult. However, by providing such a center shield 32, a tracer particle image is enlarged, and the image having enough luminance to allow the analysis by the PIV method can be taken, in spite of use of the long focus optical system 3. Though a preferable shield rate will be described in the test examples which will be described later, the shield 32 is preferably provided so that the shield rate is changeable by sticking the shields of different sizes or the like. Since in the present invention, the image of the particle contained in the fluid to be measured which is a long distance away is taken, such a particle is a sufficiently small subject. Accordingly, on the image forming surface, the particle image itself is not seen, but an Airy disk is seen, and therefore, in this specification, a "particle image" refers to the image of an Airy disk.

Further, a secondary mirror is supported by a secondary mirror support member (spider) in a lens barrel, and when a particle image is enlarged, light beams in the shape of a cross or the like due to the spider are projected and overlap the particle image to make discrimination difficult.

Hence, it is preferable to support the secondary mirror by parallel plate glasses whose surfaces are disposed to be oriented in a direction perpendicular to the optical axis of a main mirror in the lens barrel, instead of the spider in the shape of a cross or the like which has been conventionally used. The parallel plate glasses can reduce reflection of light to decrease the projection of the light beams which will be noise. Note that it is preferable to form the parallel plate glasses from an optical glass.

Figure 3:
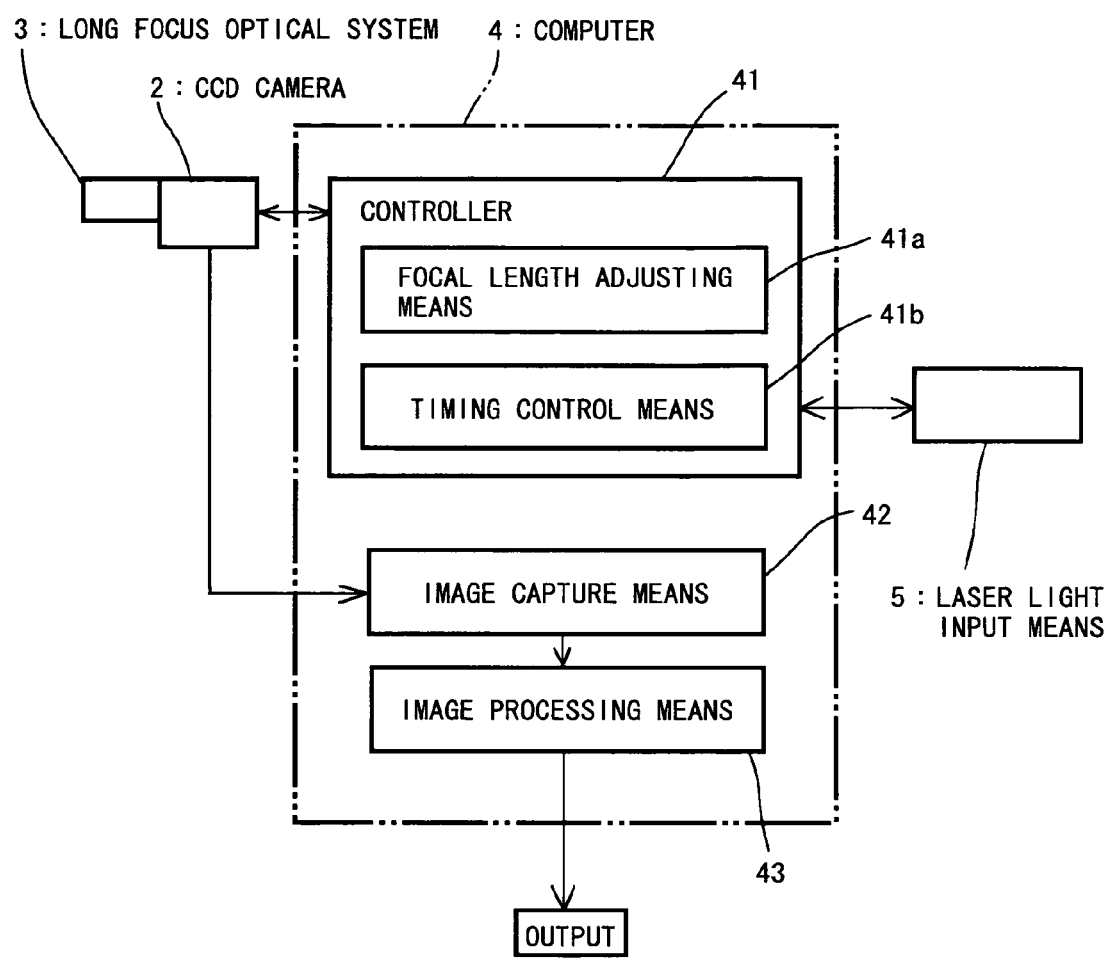
FIG. 3 is a block diagram showing a schematic configuration of a computer of the fluid measurement system according to the above embodiment.

As shown in FIG. 1 and FIG. 3, the computer 4 is connected to the CCD camera 2 and comprises a controller 41 for controlling drive of the CCD camera 2, an image capture means 42 for receiving a signal of the image taken by the CCD camera 2 and performing predetermined processing on the signal, and an image processing means 43. The controller 41 comprises a focal length adjusting means 41a for calculating an appropriate focal length f of the CCD camera 2 whose details will be described later. The image capture means 42 comprises a frame grabber board for digitizing the analog image signal from the CCD camera 2. The image processing means 43 analyzes, by the PIV method, the image frame being the digital image signal outputted from the frame grabber board. Note that it is also possible to provide a circuit for correcting the distortion aberration of the image at the stage previous to the image processing means 43.

The image processing means 43 recognizes particle images taken at two subsequent time points taken by the CCD camera 2 with a small time interval therebetween as distributions of luminance patterns, and analyzes the two particle images by comparison to estimate the amount of movement of a particle group. More specifically, it is assumed that the value at a certain point in the particle image is taken as a luminance value and the luminance values distributed within a predetermined region in the particle image are recognized as the luminance pattern, so that the image processing means 43 obtains the similarity between the luminance patterns by the cross-correlation method or the gray level difference accumulation method so as to obtain the moving amount and the moving direction of the particle group on pixels between the two images. The image processing means 43 obtains the actual flow velocity and the direction of the flow of the fluid to be measured through use of the moving amount and the moving direction on pixels of the particle group and a small time interval $\Delta t$ to analyze the flow field.

The laser light input means 5 is constructed by including a laser oscillator such as a semiconductor laser or the like, and a scanning optical system comprising a plurality of lens groups for forming laser sheets, so that the laser light oscillated from the laser oscillator is in a sheet form by the scanning optical system and is inputted into the flow field of a fluid to be measured.

In obtaining the moving amount and so on of the particle group by the analysis by the image processing means 43, if the particle groups in the predetermined luminance patterns within the particle images at the two time points are separated too far, it is impossible to recognize the correlation between them. Accordingly, it is preferable that the moving distance of the particle group falls within a range of about 0.5% to about 10% of the total number of pixels in the longitudinal or transverse direction (for example, 5 pixels to 100 pixels in the case of the total number of pixels in the longitudinal (or transverse) direction is 1000). On the other hand, an object of the present invention is to analyze the flow field of a distant fluid to be measured a long distance away from the CCD camera 2 being the imaging means, and thus the CCD camera 2 is equipped with the long focus optical system 3. Whether or not the moving amount of the particle group falls within the aforementioned range depends on the focal length f of the long focus optical system 3 as well as on the imaging time interval $\Delta t$ between two time points and on a distance L to the fluid to be measured.

Therefore, the above-described focal length adjusting means 41a of the controller 41 performs calculation to find an appropriate focal length f to allow the moving distance of the particle group between the particle images at the two time points obtained by the image processing means 43 to fall within the abovementioned range. In particular, the following relational expressions (1) and (2) are used to find the set number of moving pixels of the particle group between the particle images at the two time points set within the aforementioned range and the focal length f corresponding to the set number of moving pixels.

$$\text{Set number of moving pixels} = (V \times \Delta t)/D \quad (1)$$

$$D = (f/L) \times \text{const} \quad (2)$$

Incidentally, V represents the temporary velocity of the fluid to be measured, $\Delta t$ represents the imaging time interval between two consecutive time points, D represents the size of the image projected per pixel, and L represents the distance from the set position of the imaging means to the fluid to be measured. In addition, const represents a constant obtained from experiments and is a value obtained by actually placing a scale at the position of the fluid to be measured and measuring what number of pixels the unit length of the scale (for example, 1 mm) corresponds to. Note that when L is about 20 m or greater, it is not necessary to place the scale at the position matching the value of L, but the scale is placed at an arbitrary position of about 20 m or greater to measure what number of pixels the unit length of the scale corresponds to, in order to obtain the constant.

According to the expression (2), the size D of the image projected per pixel and the focal length f can be recognized to be in a linear proportion to find the appropriate focal length f corresponding to the number of moving pixels which falls within the aforementioned range. The reason why the size D of the image projected per pixel and the focal length f can be recognized to be in a linear proportion is that the distance L to the fluid to be measured is long. By adjusting the focal length f as described above, an appropriate long focus optical system 3 can be selected in a short processing time.

Note that if the distance L to the fluid to be measured is short, the relation between the size D of the image projected per pixel and the focal length f is non-linear, which case can be dealt with by setting a non-linear table indicating the correlation between them. Incidentally, a telecentric optical system can also be used to recognize them as being in a linear proportion as in the above case for calculation.

The above-described focal length adjusting means 41a obtains the distance L to the fluid to be measured by measurement by a predetermined method to determined the temporary velocity V of the fluid to be measured, and uses the above-described relational expressions to select the long focus optical system 3 having the focal length f corresponding to the distance L and the temporary velocity V. More specifically, the focal length adjusting means 41a derives an appropriate focal length f by calculation and thus can obtain it easily and in a short processing time. It is also possible to configure such that the CCD camera 2 is temporarily equipped with an arbitrary long focus optical system 3, the long focus optical system 3 is used to measure the image of the fluid to be measured at two time points, and the image processing means 43 analyzes a temporary flow field so that a long focus optical system 3 having the appropriate focal length f is selected depending on whether or not the obtained number of moving pixels of the particle group falls within the aforementioned predetermined range.

Note that as for the method of measuring the distance L to the fluid to be measured, it can also be calculated by a method of directly measuring the object such as a chimney or the like using a laser distance meter or a telemeter, or by the relation between positional information of the set position (longitude and latitude) of the CCD camera 2 obtained from GPS and the position (longitude and latitude) of the object. It is also possible to specify the set position of the CCD camera 2 and the position of the object on a map to calculate the distance L between them.

Further, in this embodiment, the laser light input means 5 is included to input a laser light in a sheet form into the fluid to be measured so that the CCD camera 2 takes an image. For this purpose, a timing control means 41b is provided in the controller 41 of the computer 4 which synchronizes oscillation of the laser light by the laser light input means 5 and drive of the CCD camera 2.

Figure 4:
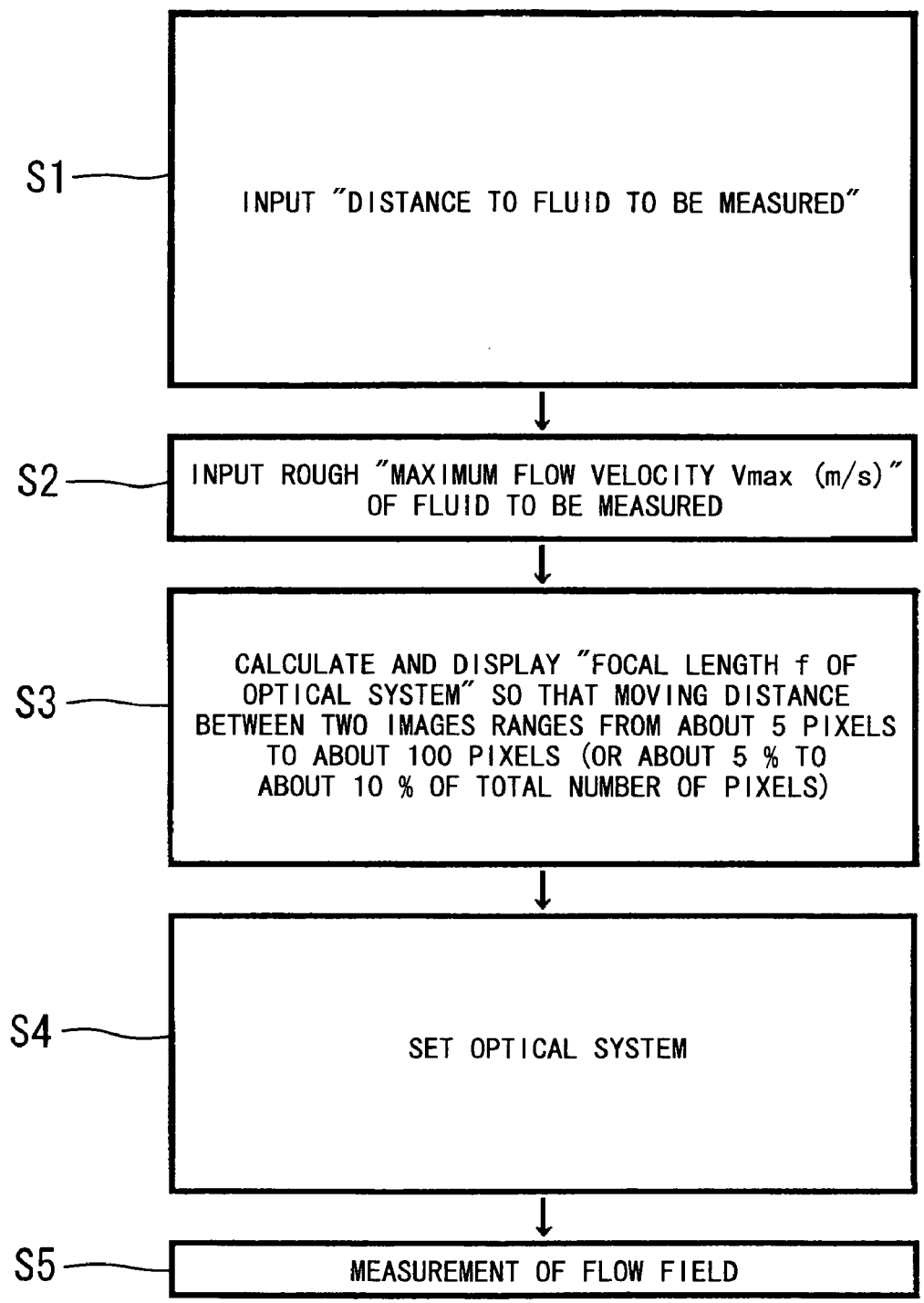
FIG. 4 is a chart illustrating an example of a fluid measurement method using the fluid measurement system according to the above embodiment.

Next, a method of measuring the fluid field of a fluid to be measured by using the fluid measurement system 1 of this embodiment will be described with reference to FIG. 4.

First of all, the CCD camera 2 is set at a predetermined position. Next, an input means of the computer 4 is used to input the distance L from the CCD camera 2 to the fluid to be measured which is measured through use of the laser distance meter or the like as described above (S1). Then, the flow velocity V (maximum flow velocity Vmax) of the fluid to be measured is inputted (S2). The flow velocity V is a temporary value for selecting the long focus optical system 3 having the appropriate focal length f as described above, which may be an arbitrary value. However, in order to make the moving distance between the two images obtained by the image processing means 43 range from about 0.5% to about 10% of the total number of pixels in the longitudinal or transverse direction as described above in a short operation time, it is preferable to input the maximum flow velocity Vmax of the fluid to be measured. For example, for the case of smoke exhausted from a chimney or the like, the maximum flow velocity Vmax can be used which is found by a calculated value based on specifications of a blower for blowing the smoke. The actual maximum flow velocity of the smoke exhausted from the chimney or the like is lower than the calculated value because of pressure drop or the like in the chimney flow passage and generally never exceeds the calculated value. As a matter of course, if the specifications of the blower cannot be specified or if volcanic ash or the like is measured, a rough maximum flow velocity Vmax is inputted referring to the empirical values or the like.

After the distance L to the fluid to be measured and the temporary flow velocity (maximum flow velocity Vmax) are determined, the focal length adjusting means calculates the focal length f corresponding to them using the above-described relational expressions (1) and (2) (S3). In this event, the imaging time interval Δt between the particle images at two time points for use in the calculation is preferably as short as possible to keep the obtained number of moving pixels of the particle group falling within the aforementioned range. Generally, the interval is set within 1/60 s to 1/30 s.

After the focal length f is determined as described above, the long focus optical system 3 corresponding thereto is selected (S4). For the single lens, for example, the turret is rotated to set it on the CCD camera 2, or for the one with the zoom mechanism, zoom is adjusted so that the laser light is inputted from the laser light input means 5 in a sheet form to take particle images at two consecutive time points. Note that it is also possible to adjust the flange focal distance corresponding to the focal length f obtained by the focal length adjusting means 41a to take the images.

Each of the taken images is transformed by the frame grabber board being the image capture means 42 into a digital signal, and the image processing means 43 obtains the flow velocity, the flow direction and so on of the actual flow field of the fluid to be measured from the moving amount and the moving direction between the luminance patterns in the particle images (S5).

Figure 5:
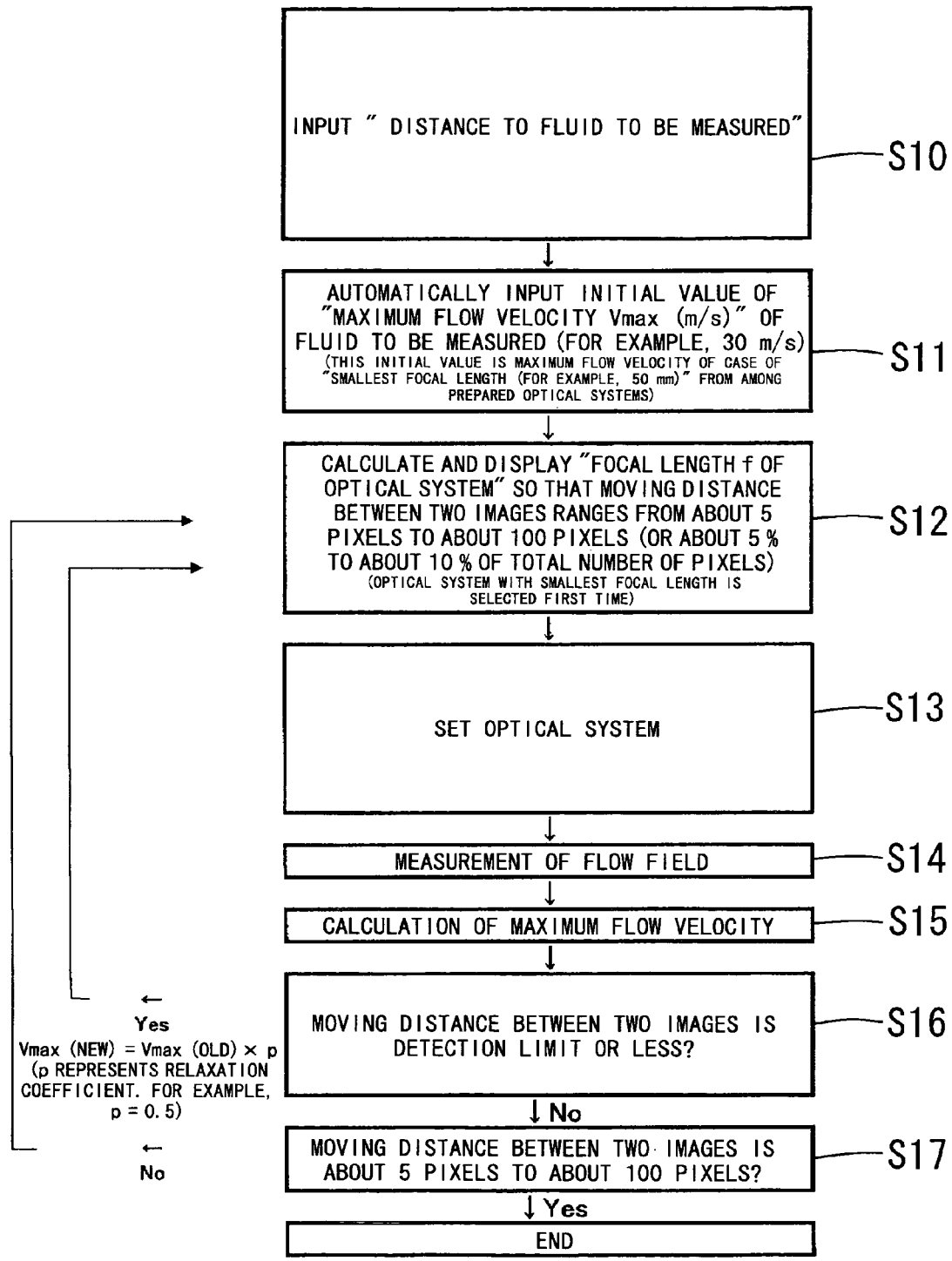
FIG. 5 is a chart illustrating another example of the fluid measurement method using the fluid measurement system according to the above embodiment.

While the case where the rough value of the maximum flow velocity Vmax of the fluid to be measured is manually inputted is explained in the above description, FIG. 5 is a flowchart for explaining the measurement method using the above-described fluid measurement system in the case where the value is automatically inputted instead of manual input.

As shown in this chart, the point that the distance L to the fluid to be measured is inputted automatically or manually is the same as in the above case (S10), but the maximum flow velocity Vmax inputted in the next step is determined taking an appropriate flow velocity as the initial value. More specifically, a maximum flow velocity Vmax (for example, 30 m/s) which can be measured even by a long focus optical system 3 having the shortest focal length f, for example, a focal length of 50 mm from among a plurality of kinds of long focus optical systems 3 prepared as those capable of being set in the CCD camera 2 is automatically inputted (S11).

A focal length f satisfying the above-described expressions (1) and (2) is calculated using the distance L to the fluid to be measured and the automatically inputted maximum flow velocity Vmax (S12). Then, a long focus optical system 3 corresponding to the calculated focal length f is selected and set in the CCD camera 2 (S13). The flow field is measured similarly to the above (S14). In this example, the maximum flow velocity Vmax is calculated from the analyzed result (S15), and whether or not the moving distance between the two images is the detection limit or less, that is, the number of moving pixels is less than one is judged (S16). Generally, such a situation does not occur, but if the automatically selected maximum flow velocity Vmax is too large as compared to the actual flow velocity, the two images are completely the same, so that it is impossible to analyze the flow field (the maximum flow velocity in step S15 cannot be obtained), and hence this step is preferably provided for just in case. If the number of moving pixels is less than one, a new maximum flow velocity Vmax to be used in the relational expressions (1) and (2) is calculated by Maximum flow velocity Vmax (new)=maximum flow velocity Vmax (old)×$p$ $p$ representing an arbitrarily defined relaxation coefficient, for example, $p=0.5$)

to find again the focal length f satisfying the relational expressions (1) and (2) to repeat the above-described steps S12 to S16.

If the number of moving pixels is one or more, whether or not the moving distance (the number of moving pixels) between the two images is about 0.5% to about 10% of the total number of pixels of the image sensor in the longitudinal or transverse direction (for example, 5 pixels to 100 pixels in the case where the total number of pixels in the longitudinal (or transverse) direction is 1000), is checked (S17). If the above condition is not satisfied, the maximum flow velocity Vmax found in step S15 is used, and the process returns to step S12 to select a long focus optical system 3 again. When the condition is satisfied, the result is outputted, and the measurement is completed.

FIG. 6 is a diagram showing a fluid measurement system 100 according to another embodiment of the present invention. The fluid measurement system 100 is the same as in the above described embodiment in the respect including a CCD camera 110, a long focus optical system 120 mounted to the CCD camera 110, and a computer 130, but differs from it in the respect that it does not have a laser light input means.

In this embodiment, a fluid to be measured is taken under natural light without inputting a laser light. Accordingly, the fluid to be measured capable of being imaged is limited to those capable of being reflected under natural light, such as water vapor, volcanic ash, smoke from a chimney, a fire site or the like, yellow sand, cloud, and pollen. According to this embodiment, it is not necessary to input a laser light, the system is suitable for analysis of the flow field of a fluid to be measured at a greater distance.

In the particle image taken by the PIV method here, it is necessary that one particle extends across two or more pixels of the CCD image sensor, and it is more preferable that one particle extends across two to five pixels. If the distance to the fluid to be measured is about 10 m to 50 m, each particle image can be captured under such a condition, but when a fluid to be measured is at a distance beyond several hundreds to one km is imaged via the long focus optical system 3, the number of particles contained in one pixel is large, and therefore it is difficult or impossible to analyze the behavior of each one of particles from the images at two time points. Hence, this embodiment is configured to calculate the spatial frequency of luminance about the image captured by the image capture means 42, and include a high-pass filter for leaving high frequency components at a predetermined frequency and higher from the calculated spatial frequency components, and transform the components passed through the high-pass filter to an image again. The high-pass filter filters the frequency components of the obtained luminance to leave only high frequency components at the predetermined frequency and higher, whereby the turbulence structure occurring in the fluid to be measured can be extracted from the fluid to be measured instead of capturing each one of particles reflected by natural light. The turbulence structure here is a cluster composed of a vortex or a flow structure similar to a vortex. By capturing the turbulence structure as a cluster as described above, each turbulence structure is captured across two or more pixels of the CCD image sensor to allow the analysis using the PIV method.

In particular, each image signal of the taken image is subjected to Fourier transform or the like to obtain the spatial frequency component which is filtered using the high-pass filter. The spatial frequency f' in filtering by the high-pass filter is preferably determined within a range found by the following expression.

$$(St/D) \times 1/3 \leq f' \leq (St/D) \times 5 \quad (3)$$

(Incidentally, in the expression, "St" represents a Strouhal number, and "D" represents a representative length of an object generating a turbulence structure.)

The spatial frequency f' here is an inverse number of the spatial wavelength L being the scale of a vortex of smoke exhausted from the chimney in the example shown in FIG. 19, but the spatial wavelength L cannot be directly found. On the other hand, the center-to-center distance L' of two contiguous vortexes can be found by the following expression.

$$L' = U \times T \quad (4)$$

(Incidentally, U represents the main flow velocity of smoke, and T represents the discharge cycle of a vortex)

Replacing this L' by the spatial wavelength, resulting in Spatial frequency f'=1/L'.

On the other hand, Strouhal number St=(1/T)×(D/U) leads to $$U = (1/T) \times (D/St) \quad (5).$$

Substituting the expression (5) into the expression (4) yields $$L' = D/St, \text{ that is, } f' = 1/L' = St/D \quad (6).$$

The value f' found by the expression (6) is the spatial frequency to be used in filtering. However, in extracting an effective turbulence structure, the spatial frequency is not limited to the value found by the expression (6) but can be determined within a range of 1/3 times or greater and 5 times or less of the f' value found by the expression (6), which will be the condition when the above-described expression (3) determines the spatial frequency f.

According to the expression (3) (or the expression (6)), the special frequency f' can be easily found only with the representative length D of an object generating the turbulence structure and the Strouhal number St without obtaining the main flow velocity U and the discharge cycle T. The representative length D is, for example, the diameter of a chimney and thus its value can easily be found out, and the value of the Strouhal number St is known by experiments according to the shape of an object generating the turbulence structure (see, for example, Inoue and Kiya "Non-linear Phenomenon of Turbulence and Wave" (Asakura Publishing Co., Ltd. 1993) p. 162).

If a value smaller than the range of the above-described expression (3) is used as the spatial frequency f' in filtering, the image is close to the original image to fail to discriminate the turbulence structure, whereas if a larger value is used, the turbulence structure itself is also removed, both cases being undesirable.

A. Simulation Test to Confirm Effectiveness of a Shield

Test examples 1 and 2 are simulation tests on the case where the CCD camera takes a particle image across two pixels or more (for a long distance), and test example 3 is that on the case where the CCD camera takes a plurality of particle images in one pixel (for an ultra-long distance).

TEST EXAMPLE 1

Figure 8A:
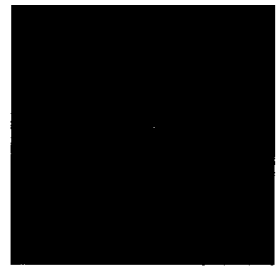
FIGS. 8A to 8C are diagrams simulating the particle images of the tracer in FIGS. 7A to 7C on the pixels of the CCD image sensor.
Figure 8B:
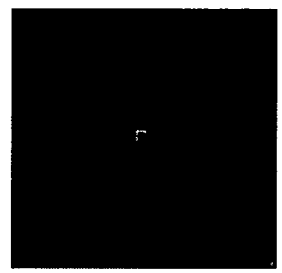
Figure 8C:
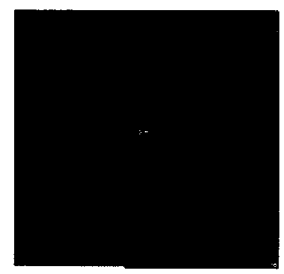

Conditions of a Fluid Measurement System used in Calculation in the Simulation Test
(a) Long focus optical system
    Aperture: 140 mm and Focal length: 2,000 mm
(b) CCD camera
    Size per pixel: 9 μm
    Measurement Simulation FIGS. 7A to 7G show simulation showing particle images (image of Airy disk) of one tracer of a diameter Dt of 30 μm taken by using the above described optical telescope from a distance Lt of 20 mm away, FIG. 7A shows the case of a center shield rate (center shield diameter/optical telescope aperture) of 0% by the shield (center shield) covering the part including the central portion of the front surface of the main mirror, FIG. 7B shows the case of a center shield of 35%, and FIG. 7C shows the case of a center shield rate of 50%. The optical system used for imaging a very small tracer is also regarded as the long focus optical system. In FIG. 7A, only the disk in the center of the Airy disk is clear, but it is found out that when the center shield rate is increased as in FIGS. 7B and 7C, the intensity of the refraction ring surrounding the disk in the center becomes high, and as a result, the image of the Airy disk including the refraction ring, that is, the particle image of the tracer can be enlarged without being out of focus. Simulation of this on the pixels of the CCD image sensor results in what is shown in FIGS. 8A to 8C. As is obvious from the drawings, in the case of a center shield rate of 0%, the image is across only two pixels, but with center shield rates of 35% and 50%, the image is taken across three pixels, and the image becomes clearer in sequence. The proper center shield rate differs depending on the aperture of the optical telescope, the distance to the fluid to be measured and the like, but when one particle image is taken across two pixels or more, the center shield rate is preferably selected from the range of 20 to 60%.

Here, as the means for enlarging the particle image, that is, the image of the Airy disk, the method for bringing the image out of focus by shifting the focal length is conventionally known. FIG. 7D is the image of the Airy disk taken by shifting only the focal length by 0.3 mm under the same conditions as those in FIG. 7A. As a result, the image of the Airy disk is enlarged as compared with FIG. 7A, but the image is out of focus with the edge being unclear, and therefore, this is not suitable for PIV analysis. FIGS. 7E and 7F show the images when the center shield rate is set at 35% and 50% with the focal length shifted by 0.3 mm, and as compared with the states in focus of FIGS. 7B and 7C, it is found out that in each case, both the edge of the disk in the center of the Airy disk and the refraction ring are unclear. By making the aperture of the long focus optical system 3 small, the particle image (image of the Airy disk) becomes large. FIG. 7G shows the image taken by the optical telescope of an aperture of 70 mm. As compared with FIG. 7A, the particle image becomes large, but lacks in brightness, and therefore, this is not suitable for PIV analysis.

EXAMINATION EXAMPLE 2

Figure 9A:
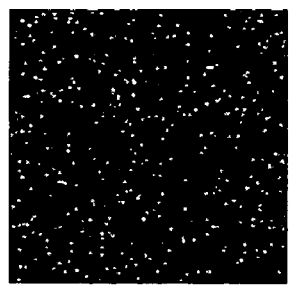
FIG. 9A is an example of a standard image used for PIV analysis.

FIG. 9A is one example of the standard image (No. 5) used for PIV analysis, which is published in "Okamoto, K., Nishino, S., Saga, T. and Kobayashi, T., "Standard images for particle-image velocimetry," Meas. Sci. Technol., 11, 685-691, 2000".

Figure 9D:
FIGS. 9B to 9D are simulation diagrams using the standard image in FIG. 9A, and FIGS. 9E and 9F are simulation diagrams of the case where the aperture is made to differ.
Figure 9B:
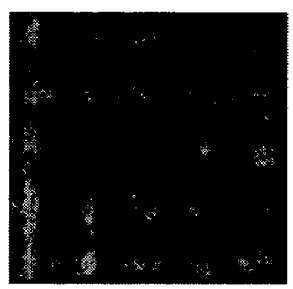

The diameter of the particle image of the standard image of FIG. 9A is five pixels, and when it is assumed that the image of a particle of 30 μm is taken at a distance of 20 m, its resolution is 16.2 pixels/arcsec. Thus, in accordance with this condition, the case where the particle image is taken by the same fluid measurement system 1 as in the test example 1 is simulated using the standard image, the results are as shown in FIGS. 9B to 9D. FIG. 9B shows the case of a center shield rate by the center shied (center shield diameter/optical telescope aperture) of 0%, FIG. 9C shows the case of a center shield rate of 35%, and FIG. 9D shows the case of a center shield rate of 50%.

The results also show that as the center shield increases to 35% and 50%, the clearer particle images can be obtained.

Figure 9E:
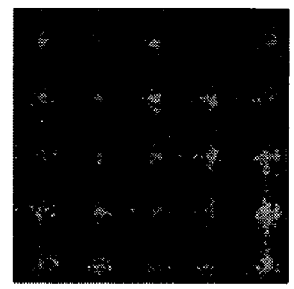
Figure 9C:
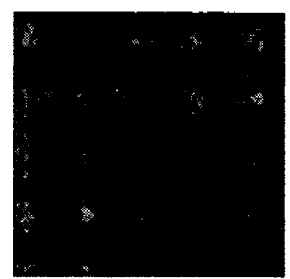
Figure 9F:
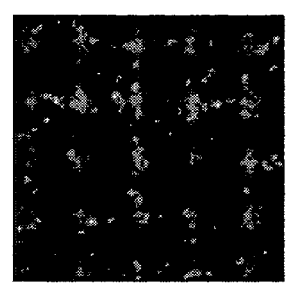

The simulation results when the aperture of the long focus optical system 3 is set at 70 mm (center shield rate of 0%) and 250 mm (center shield of 50%) under the same conditions are shown in FIGS. 9E and 9F, which show that as the aperture becomes larger, the clearer particle image can be obtained.

TEST EXAMPLE 3

Figure 10A:
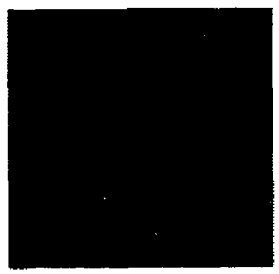
FIG. 10A is an original image for simulation when luminance information of scattered light from a number of particles is recorded in one pixel of a CCD camera.
Figure 10B:
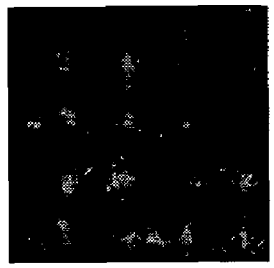
FIGS. 10B to 10D are images simulating the case when taken by the fluid measurement system similar to that in Test Example 1.
Figure 10C:
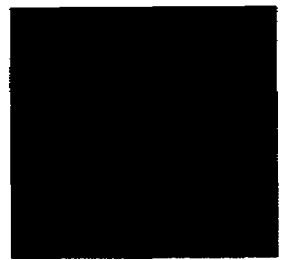
Figure 10D:

FIG. 10A is an original image for simulation when luminance information of scattered light from a number of particles is recorded in one pixel of the CCD camera 2, and FIGS. 10B to 10D are images simulating the case where the same fluid measurement system 1 as in the test example 1 takes the images.

Figure 11A:
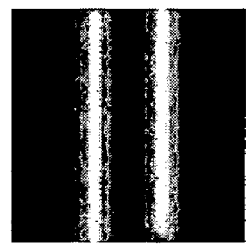
FIG. 11A is an original image of a parallel light source in which luminance information from a number of particles is recorded in one pixel of the CCD camera similarly to FIG. 10A, FIGS. 11B to 11D are images simulating the case when taken by the fluid measurement system similar to that in Test Example 1.
Figure 11D:
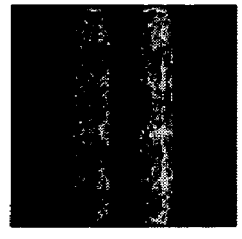
FIG. 11E is a simulation image using a long focus optical system having an aperture of 70 mm and when the center shield rate is 0%.
Figure 11B:
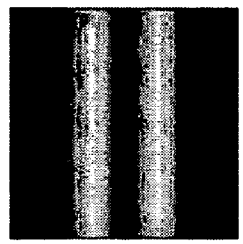
Figure 11E:
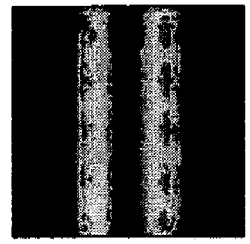
Figure 11C:
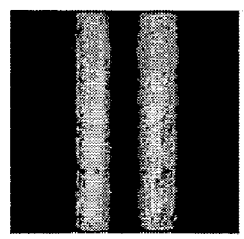

FIG. 11A is an original image of a parallel light source in which luminance information from a number of particles is recorded in one pixel of the CCD camera 2 similarly to FIG. 10A, and FIGS. 11B to 11D are images simulating the case where the same fluid measurement system 1 as in the test example 1 takes the images. Note that FIG. 10B and FIG. 11B show the case of a center shield rate by the center shield of 0%, FIG. 10C and FIG. 11C show the case of a center shield rate of 35%, and FIG. 10D and FIG. 11D show the case of a center shield rate of 50%. Further, FIG. 11E is a simulation image in the case using a long focus optical system having an aperture of 70 mm and when the center shield rate is 0%.

As is clear from those drawings, when the number of particles in one pixel is plural, the image was blurred with increasing center shield rate unlike the cases of the test example 1 and test example 2. Thus, a lower shield rate of the shield is more preferable in the fluid measurement system 100 used for an ultra-long distance which extracts and measures the turbulence structure of the fluid to be measured. The shield rate is preferably 0% to 40%, more preferably, 0% to 20%, and most preferably 0%. However, comparing FIG. 11B and FIG. 11E, the image is clearer with increasing aperture of the long focus optical system, which is the same as in the test example 1 and test example 2.

B. Test of Analyzing the Actual Flow Field

The fluid to be measured was imaged via the long focus optical systems 3 and 120 and a test of analyzing its flow field by the PIV method was carried out for each of the above-described fluid measurement systems 1 and 100.

TEST EXAMPLE 4

Configuration of the Fluid Measurement System 1 (for a Long Distance)

(a) Long focus optical system 3

TV-76 optical telescope (manufactured by TELE VUE OPTICS, (Aperture: 76 mm and Focal length: 480 mm))

Though the intrinsic center shield rate of the above described TV-76 optical telescope is 0%, a shield was attached to the main mirror front surface to adjust the shield rate (center shield rate) to 50%.

The aforementioned TV-76 was provided at the CCD camera 2, and the images of a graph paper and a scale were taken from positions 20 m and 50 m away therefrom and compared to confirm that there was no distortion in the images.

(b) CCD camera 2

Product name "MEGAPLUS ES1.0 (10-bit)" (manufactured by Redlake (size per pixel: 9 μm))

(c) Frame grabber board

Product name "PIXCI-D2X" (manufactured by EPIX) (The digital image signal obtained by the CCD camera 2 is recorded on a hard disk of the computer 4 via the frame grabber board.)

(d) Laser light input means 5

Nd-YAG laser (Product name "Gemini PIV 120 mJ" (manufactured by New Wave Research Co.)

Measurement

With the distance L to the object to be measured from the set position of the CCD camera 2 equipped with the long focus optical system 3 set at 20 m, water mist was sprayed as a tracer particle, and Nd-YAG laser was inputted in a sheet form by the laser light input means 5 to obtain three pairs of images at two time points at an imaging time interval $\Delta t=1/15$ s.

Figure 12:
FIG. 12 is a view showing the appearance of a flow field of the fluid to be measured which is measured in Test Example 4.

Image signals at two time points of each of the pairs which are obtained were transmitted as digital signals to the image processing means 43 from the frame grabber board to be analyzed by the cross-correlation method. FIG. 12 shows the appearance of the flow field of the fluid to be measured of which three pairs of particle images were analyzed. As is obvious from FIG. 12, in spite of the distance of 20 m to the fluid to be measured and use of the long focus optical system 3, the moving amount and moving direction of the tracer particle was able to be captured with sufficient luminance. The average velocity field was 1/5 s, the maximum vector values of the respective pairs were 14.35 pixels, 19.63 pixels and 16.95 pixels, and the average of them was 16.97 pixels. This leads to a flow velocity of 254.6 pixels/s=38.95 mm/s, from 16.97×15.

TEST EXAMPLE 5

Configuration of the Fluid Measurement System 1 (for a Long Distance)

The same as in the test example 4

Measurement

Figure 13:
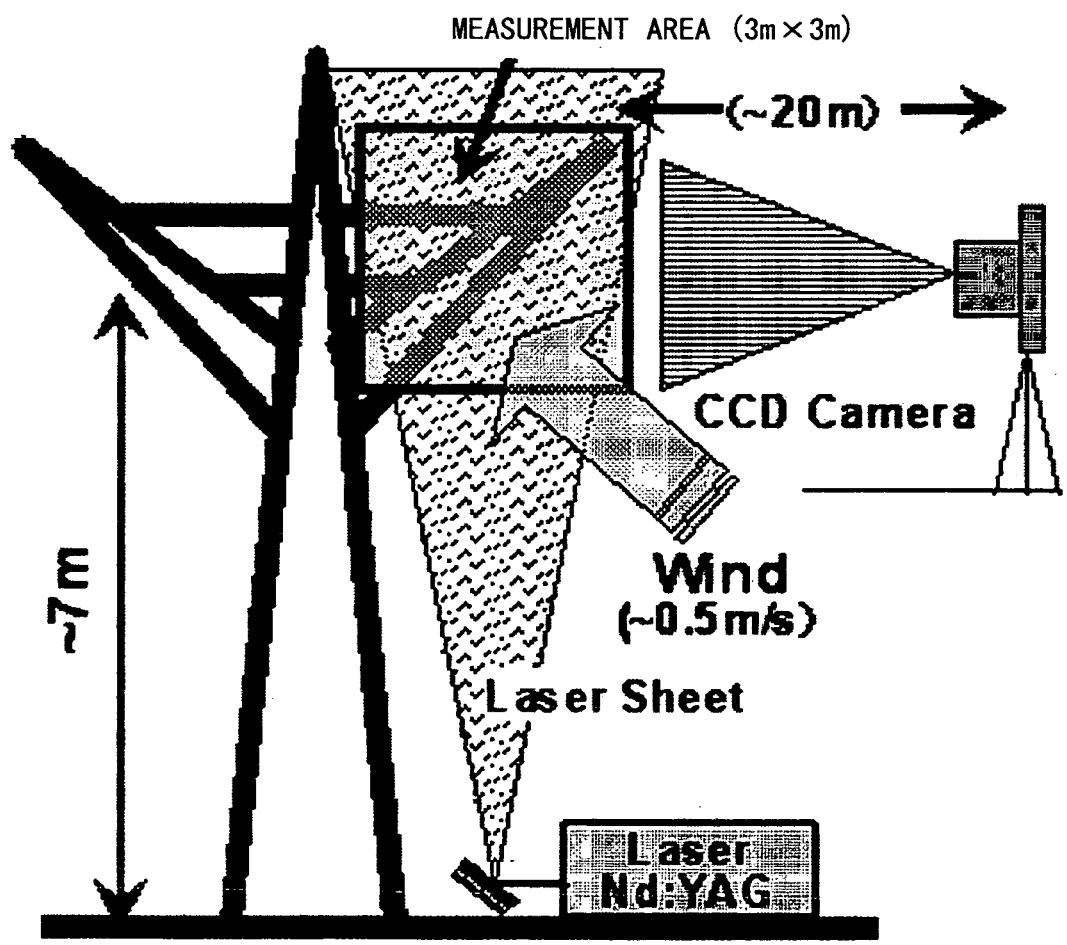
FIG. 13 is a view for explaining the outline of a fluid measurement system in Test Example 5.

As shown in FIG. 13, the same CCD camera 2 as that in the test example 4 was set at the location at a distance of 20 m sideway from the transmission tower installed for exhibition inside the building, and the air flow around the transmission tower was measured. More specifically, an air flow of 0.4 m/s was generated by a fan, water mist and dust were sprayed as the tracer particles to the measurement area near the power transmission line suspension part of the transmission tower (the area at a height of about 7 m from the ground surface of the transmission tower), and Nd-YAG laser was inputted in a sheet form from the laser light input means 5 to measure the air flow. The images at two time points was taken at an imaging time interval of $\Delta t=1/15$ s.

Figure 14:
FIG. 14 is a view showing the appearance of a flow field of the fluid to be measured which is measured in Test Example 5.

FIG. 14 shows the appearance of the flow field obtained by analyzing the obtained image signals of two time points of each pair as in the test example 4. As is obvious from FIG. 14, in this test example, the moving amounts and moving directions of the tracer particles were also able to be captured with sufficient luminance. Accordingly, the system shown in FIG. 13 can be used for measuring an air flow around the power transmission line placed at a height above the ground of about 50 m to 60 m, and a wind speed distribution around a high-rise building.

TEST EXAMPLE 6

Configuration of the Fluid Measurement system 100 (for an Ultra-long distance)

(a) Long focus optical system 120

Maksutov-Cassegrain optical telescope (manufactured by ORION OPTICS, product name "OMI-140" (Aperture: 140 mm and Focal length: 2,000 mm))

Note that at the time of measurement, the focal length was adjusted to 1,260 mm using a reducer.

Further, while a shield was not provided on the front surface of the main mirror, but the center shield rate intrinsic to the aforementioned Maksutov-Cassegrain optical telescope was 33%.

The aforementioned Maksutov-Cassegrain optical telescope was provided at the CCD camera 110, and the images of a graph paper and a scale were taken from positions 20 m and 50 m away therefrom and compared to confirm that there was no distortion in the images.

(b) CCD camera 110

Product name "MEGAPLUS ES1.0 (10-bit)" (manufactured by Redlake (size per pixel: 9 μm))

(c) Frame grabber board

Product name "PIXCI-D2X" (manufactured by EPIX) (The digital image signal obtained by the CCD camera 2 is recorded on a hard disk of the computer 4 via the frame grabber board.) The others were completely the same as those in the test example 4 except that the laser light input means was not included.

Measurement

The fluid to be measured was exhaust smoke exhausted from the tip of the chimney of a thermal power station, and a fluid measurement system 100 was set at a position 7.8 km away from the fluid to be measured. Under the sunlight, its image was taken at the imaging time interval Δt=1/30 s. Each of the obtained image signals at two time points was subjected to Fourlier transform to obtain the spatial frequency components, and the high-pass filter was used for the spatial frequency components to leave only high frequency components at a predetermined frequency and higher to thereby extract the turbulence structure. In the case of this test example, as for the representative length D of the aforementioned expression for use in determining the frequency f' to be filtered, the diameter of the discharge port of the chimney tip was 10 m, and the Strouhal number St was set to 0.4 from a general numeral value in analysis of flow (see, for example, Inoue and Kiya "Non-linear Phenomenon of Turbulence and Wave" (Asakura Publishing Co., Ltd. 1993) p. 162), with the result that f' was 0.04 (1/m). The image of the turbulence structure was subjected to analysis processing by the cross-correlation method in the image processing means 43.

Figure 17:
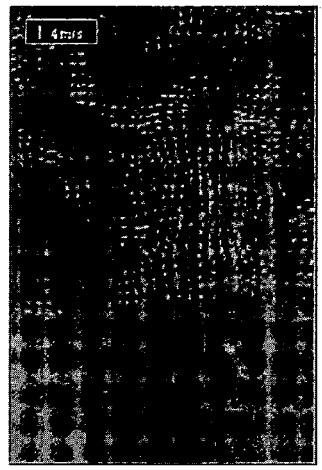
FIG. 17 is a view showing the appearance of a flow field of the fluid to be measured which is measured in Test Example 6.

FIG. 15 is an original image of exhaust smoke being the fluid to be measured in this test example. FIG. 16 is an image of the turbulence structure showing the resulting original image filtered by the high-pass filter and then inversely transformed. FIG. 16 shows that filtering processing by the high-pass filter extracts the turbulence structure. FIG. 17 is a view showing the appearance of flow field of the fluid to be measured by vectors using the images at two time points obtained in a manner of FIG. 16. As shown in FIG. 17, the moving amount and the moving direction of the exhaust smoke could be taken in a sufficient luminance by the method of this test example.

Figure 18:
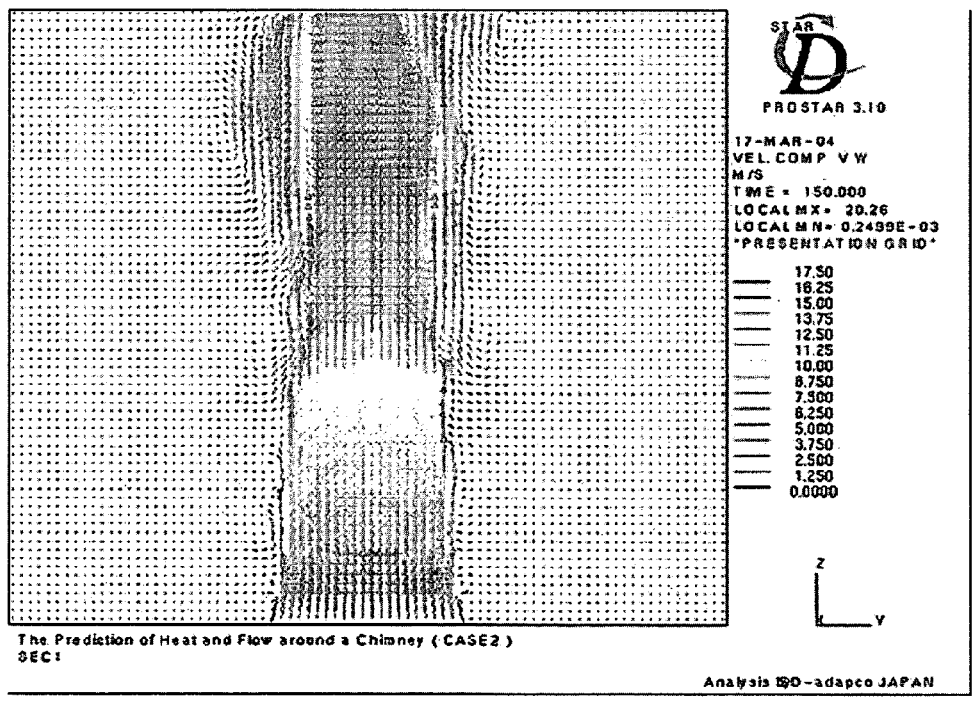
FIG. 18 is a simulation diagram of exhaust smoke under the same conditions as those of Test Example 6.

For comparison, simulation was performed using the numeral value analysis code "STAR-CD (trade name)" under the same conditions as those of the exhaust smoke measured as described above. The simulation result is shown in FIG. 18. Comparing FIG. 17 with FIG. 18, the shapes and velocity vectors of rising exhaust smokes well matched each other. Further, the flow rate of the exhaust smoke exhausted from the chimney obtained from FIG. 17 substantially matched the operating flow rate at the thermal power station. Accordingly, it is obvious that the measure system used in this test example is suitable for measurement of the flow field in an ultra-long distance such as a distance to the fluid to be measured of 7.8 km.

In analyzing the flow field of the fluid to be measured using the long focus optical system of the present invention, the system has a characteristic when taking images outdoors that unnecessary background (a mountain, building or the like) is projected in the image taken by the CCD camera 2. Hence, in this case, it is preferable to set a difference calculation means as the pre-processing means before the image processing means processes the image.

The difference calculation means repeats, for example, taking a pair of images at two consecutive time points at a time interval of Δ t1 and taking again a pair of images at two consecutive time points at a time interval of Δ t1, with a time of Δ t2 intervening therebetween, to thereby take a plurality of pairs of images at a time interval of Δ t1 at two time points. Then, as shown in FIG. 20, the difference between the images at the two consecutive time points in each pair is obtained. As a result, the same image signal on the same pixel is cancelled. In other words, the image signal of the background which is projected in the two images but never moves is cancelled, and as a result, only the moved particle image is left. The image obtained by the difference calculation means as described above is regarded as a difference luminance pattern distribution, so that two difference luminance pattern distribution images with a time of Δ t2 intervening therebetween are obtained and processed by the image processing means 43. This ensures that the image signal of the background does not interfere with image processing to increase the accuracy of the flow field analysis of the fluid to be measured.

The difference calculation means may be, in addition to the above, means for taking a plurality of sets of images at three consecutive time points at a time interval of Δ t1, obtaining the central difference in each of the sets, and using the difference luminance pattern distribution images obtained from the central differences as shown in FIG. 21. Further, as shown in FIG. 22, it is also possible to employ means for sequentially taking images at a consecutive plurality of time points at a time interval of Δ t1, and sequentially obtaining the difference luminance pattern distribution images between the images at two consecutive time points.

Besides, at the time of imaging a distant fluid to be measured a long distance away, the depth of field is large even if the CCD 2 is in focus. Therefore, the accuracy when reproducing the velocity vectors of the particle on the two dimensional coordinates is lower as compared with that of the case where the fluid to be measured at a short distance such as about 1 m is imaged. Hence, to obtain more accurate two-dimensional velocity vectors, it is preferable to prepare three CCD cameras 2 and to use means for imaging the same fluid to be measured in three directions. For example, with respect to a line connecting the central CCD camera and the fluid to be measured, other two CCD cameras are set at positions separated at predetermined angles α 1 and α 2 on the right and left. The image processing means 43 first processes the images obtained from the respective cameras to obtain the velocity vectors. Then, using the angles α 1 and α 2 and the distances from the right and left CCD cameras to the fluid to be measured, the image processing means 43 performs coordinate transformation of the velocity vectors obtained by processing the images obtained by the right and left CCD cameras to the velocity vectors obtained when taking an image at the position of the central CCD camera. Then, the coordinate-transformed velocity vectors of the right and left images are compared to the velocity vectors of the image taken by the central CCD camera to extract only the overlapping velocity vectors of the particles. Consequently, more accurate two-dimensional velocity vectors can be obtained even for the case of a larger depth of field.

INDUSTRIAL AVAILABILITY

From the above, in the present invention, an image is taken using the long focus optical system, and the obtained image is processed using the PIV method, whereby the flow field of an inaccessible distant fluid to be measured can be analyzed. Accordingly, the present invention can be used, for example, for operation control at the power station by analyzing the flow field of smoke from a chimney, for operation control by analyzing the flow field of water vapor from a cooling tower of the atomic power station or the geothermal power station, for environmental impact evaluation by analyzing the flow field of volcanic ash and yellow sand, and so on. Further, it is possible to analyze the flow field of smoke generated from a large-scale fire site to contribute the analysis to countermeasure, evacuation guidance, and so on. Further, by allowing the laser light to be inputted into the distant fluid to be measured, airflow can also be analyzed. In addition, analysis of the flow field of cloud (cloud base portion) can be utilized for local weather forecast and even for analysis of wind around power transmission lines or transmission towers and for measurement of flow of pollen. Furthermore, for volcano eruption or large-scale fire, the fluid measurement system of the present invention can be mounted on a vehicle to analyze the flow field while moving so as to help grasping the disaster occurrence state on real time and taking effective countermeasure against the disaster. Note that the distance from the long focus optical system to the fluid to be measured is different depending on the accuracy of the long focus optical system and the image sensor in use. The distance is preferably, but not especially limited to, 10 m or greater and 20 km or less for practical use in consideration of the performance of the available long focus optical system and so on.

The invention claimed is:

1. A fluid measurement system comprising:
an imaging means for taking images of particles contained in a fluid to be measured at small time intervals, said imaging means comprising a long focus optical system being of a long distance type that images a fluid to be measured a long distance away, and said long focus optical system being provided with a shield which shields a part including a central portion of a main mirror at an arbitrary shield rate, wherein said shield rate is set in a range of 20% to 60% when one particle image obtained by the imaging means is across two pixels or more, and is set in a range of 0% to 40% when a plurality of particle images are contained in one pixel;
a control means for controlling said imaging means; and
an image processing means for comparing luminance pattern distributions at a plurality of consecutive time points obtained by said imaging means to measure a moving direction and a moving amount of a particle group, and analyzing a flow field of the fluid to be measured.

2. The fluid measurement system according to claim 1, wherein
the shield rate found by a ratio of a diameter of said shield to an aperture of said long focus optical system is provided to be arbitrarily adjustable.

3. The fluid measurement system according to claim 1, wherein
a secondary mirror included in said long focus optical system is supported by parallel plate glasses whose surfaces are disposed to be oriented in a direction perpendicular to an optical axis of a main mirror in a lens barrel.

4. The fluid measurement system according to claim 1, wherein
said imaging means is of a long distance type that images a luminance pattern distribution by natural light reflection in the fluid to be measured a long distance away.

5. The fluid measurement system according to claim 1, further comprising:
a laser light input means for inputting a laser light in a sheet form into the fluid to be measured,
wherein said imaging means is of a long distance type that images a luminance pattern distribution by laser light reflection in the fluid to be measured a long distance away.

6. The fluid measurement system according to claim 1, wherein
said imaging means is of a long distance type that images the fluid to be measured 10 m or greater and 20 km or less away from a set position of said imaging means.

7. A long focus optical system, comprising:
a lens barrel;
a main mirror and a secondary mirror supported in the lens barrel; and
a shield that shields a part including a central portion of the main mirror at a predetermined shield rate, wherein
the shield rate found by a diameter of said shield with respect to an aperture is settable in a range from 20% to 60% when one particle image obtained by an imaging means is across two pixels or more, and is settable in a range from 0% to 40% when a plurality of particle images are contained in one pixel.

8. The long focus optical system according to claim 7, wherein
said secondary mirror is supported by parallel plate glasses whose surfaces are disposed to be oriented in a direction perpendicular to an optical axis of a main mirror in the lens barrel.

9. The long focus optical system according to claim 7, wherein said long focus optical system is included in an imaging means in a fluid measurement system comprising an imaging means for taking images of particles contained in a fluid to be measured a long distance away at small time intervals, a control means for controlling said imaging means, and an image processing means for comparing luminance pattern distributions at a plurality of consecutive time points obtained by said imaging means to measure a moving direction and a moving amount of a particle group, and analyzing a flow field of the fluid to be measured.

10. A fluid measurement system, comprising:
a camera configured to take images of particles contained in a fluid to be measured at small time intervals, said camera comprising a long focus optical system being of a long distance type that images a fluid to be measured a long distance away, and said long focus optical system being provided with a shield that shields a part including a central portion of a main mirror at an arbitrary shield rate, wherein said shield rate is set in a range of 20% to 60% when one particle image obtained by the camera is across two pixels or more, and is set in a range of 0% to 40% when a plurality of particle images are contained in one pixel; and
a computer configured to control said camera, said computer including an image processor configured to compare luminance pattern distributions at a plurality of consecutive time points obtained by said camera to measure a moving direction and a moving amount of a particle group, and analyze a flow field of the fluid to be measured.

* * * * *